United States Patent
Moriuchi et al.

(10) Patent No.: US 11,572,300 B2
(45) Date of Patent: Feb. 7, 2023

(54) METHOD FOR MANUFACTURING MEDICAL GLASS CONTAINER AND FIRE BLAST DEVICE PROVIDED WITH ROTATOR

(71) Applicant: Nipro Corporation, Osaka (JP)

(72) Inventors: Kazuhisa Moriuchi, Osaka (JP); Yoshio Inoue, Osaka (JP); Atsushi Ishikawa, Osaka (JP); Yoshihiro Kawai, Osaka (JP)

(73) Assignee: NIPRO CORPORATION

( * ) Notice: Subject to any disclaimer, the term of this patent is extended or adjusted under 35 U.S.C. 154(b) by 817 days.

(21) Appl. No.: 15/567,636

(22) PCT Filed: Apr. 21, 2016

(86) PCT No.: PCT/JP2016/062590
§ 371 (c)(1),
(2) Date: Oct. 19, 2017

(87) PCT Pub. No.: WO2016/171197
PCT Pub. Date: Oct. 27, 2016

(65) Prior Publication Data
US 2018/0111868 A1    Apr. 26, 2018

(30) Foreign Application Priority Data

Apr. 24, 2015 (JP) .............................. JP2015-089625

(51) Int. Cl.
*C03B 32/00* (2006.01)
*A61J 1/05* (2006.01)
(Continued)

(52) U.S. Cl.
CPC ................. *C03B 32/00* (2013.01); *A61J 1/05* (2013.01); *C03B 23/043* (2013.01);
(Continued)

(58) Field of Classification Search
None
See application file for complete search history.

(56) References Cited

U.S. PATENT DOCUMENTS 2,367,495 A * 1/1945 Gray .................... C03B 23/055
65/279
2,392,104 A * 1/1946 Smith ................... C03B 23/055
604/218
(Continued)

FOREIGN PATENT DOCUMENTS

CN           1923735 A      3/2007
CN         104159857 A     11/2014
(Continued)

*Primary Examiner* — Jodi C Franklin
(74) *Attorney, Agent, or Firm* — Jordan and Koda, PLLC

(57) ABSTRACT

To provide a method for manufacturing a medical glass container prevented from breakage and deformation and a fire blasting device.
A method for manufacturing a medical glass container includes a processing process of placing a glass container 10 on the outer peripheral surface of each of a first roller 61 and a second roller 62, which are disposed side by side in such a manner that the axis lines are parallel to each other, so that the axis line of the glass container 10 is parallel to the axis lines of the first roller 61 and the second roller 62 and the entire outer peripheral surface in an inner surface 15 of the glass container 10 corresponding to a region deteriorated by processing is made to abut on the outer peripheral surface of each of the first roller 61 and the second roller 62, and then applying a flame ejected from a point burner 30 to the region deteriorated by processing in the inner surface 15 of the glass container 10 while rotating the glass container 10 by rotating the first roller 61 and the second roller 62 around the axis lines.

10 Claims, 9 Drawing Sheets

(51) Int. Cl.
    *C03B 23/043*     (2006.01)
    *C03B 23/09*     (2006.01)
    *C03C 23/00*     (2006.01)
    *C03B 29/02*     (2006.01)
    *C03B 23/045*     (2006.01)
    *A61J 1/06*     (2006.01)

(52) U.S. Cl.
    CPC .......... *C03B 23/045* (2013.01); *C03B 23/095* (2013.01); *C03B 29/02* (2013.01); *C03C 23/007* (2013.01); *A61J 1/06* (2013.01)

(56) References Cited

U.S. PATENT DOCUMENTS

| | | | | |
|---|---|---|---|---|
| 2,743,553 | A * | 5/1956 | Armistead | C03C 3/091 501/15 |
| 2,980,957 | A * | 4/1961 | Hicks, Jr. | C03B 37/029 65/412 |
| 3,343,937 | A * | 9/1967 | Lewis | C03B 23/095 65/274 |
| 3,367,472 | A * | 2/1968 | Rossi | B05C 13/025 198/482.1 |
| 3,642,461 | A * | 2/1972 | Heaton | C03B 9/12 65/184 |
| 3,690,456 | A * | 9/1972 | Powers, Jr. | G01N 21/9009 73/104 |
| 3,699,829 | A * | 10/1972 | Gelfman | B26D 7/01 225/2 |
| 3,775,084 | A * | 11/1973 | Heaton | C03B 9/12 65/109 |
| 3,868,170 | A * | 2/1975 | DeLuca | C03C 3/06 65/32.4 |
| 3,902,727 | A * | 9/1975 | Banyas | C03B 9/46 279/106 |
| 3,933,091 | A * | 1/1976 | Von Saspe | B29C 59/085 101/40 |
| 4,576,622 | A * | 3/1986 | Jung | C03B 37/01807 65/417 |
| 4,659,350 | A * | 4/1987 | Parisi | C03B 23/045 55/504 |
| 5,322,542 | A * | 6/1994 | Ogata | C03B 29/02 65/102 |
| 5,683,483 | A * | 11/1997 | Yosiaki | C03B 23/047 65/DIG. 9 |
| 6,055,829 | A * | 5/2000 | Witzmann | C03B 33/0955 216/65 |
| 6,082,077 | A * | 7/2000 | Christ | B65G 17/48 198/408 |
| 6,196,028 | B1 * | 3/2001 | Humbert | C03B 37/01486 65/483 |
| 6,742,363 | B1 * | 6/2004 | Yamamura | C03B 23/047 65/377 |
| 6,884,399 | B2 * | 4/2005 | Reisfeld | B01D 53/86 422/186.3 |
| 7,392,633 | B2 * | 7/2008 | Heil | B65G 17/002 53/250 |
| 8,522,575 | B2 * | 9/2013 | Wada | F23D 14/56 65/120 |
| 10,710,921 | B2 * | 7/2020 | Wada | C03B 29/02 |
| 2006/0096319 | A1 * | 5/2006 | Dalstra | G01N 33/386 65/29.21 |
| 2006/0267250 | A1 * | 11/2006 | Gerretz | C03B 23/092 264/328.1 |
| 2007/0080045 | A1 * | 4/2007 | Lutz | G07F 7/0609 198/373 |
| 2009/0009000 | A1 * | 4/2009 | Hideo | C03C 3/04 |
| 2009/0099000 | A1 * | 4/2009 | Kuwabara | C03B 29/02 65/109 |
| 2010/0095790 | A1 * | 4/2010 | Raupp | B07C 5/3408 73/865.8 |
| 2010/0255229 | A1 * | 10/2010 | Wada | F23D 14/38 428/34.4 |
| 2011/0025840 | A1 * | 2/2011 | Fiegler | G01N 21/9027 348/127 |
| 2011/0032510 | A1 * | 2/2011 | Furnas | G01B 11/06 356/33 |
| 2012/0060558 | A1 * | 3/2012 | Haselhorst | C03B 23/092 65/29.21 |
| 2012/0247151 | A1 * | 10/2012 | Kelly | C03B 29/02 65/33.1 |
| 2013/0233022 | A1 * | 9/2013 | Kuwabara | C03B 23/099 65/109 |
| 2013/0291601 | A1 * | 11/2013 | Otosaka | C03B 37/07 65/435 |
| 2015/0114043 | A1 * | 4/2015 | Risch | C03B 23/045 65/374.13 |
| 2015/0197443 | A1 * | 7/2015 | Voelkl | C03B 23/118 65/29.14 |
| 2016/0016841 | A1 * | 1/2016 | Frost | C03C 23/007 65/117 |
| 2016/0168005 | A1 * | 6/2016 | Gromann | C03B 23/045 65/109 |
| 2017/0022088 | A1 * | 1/2017 | Witte | C03B 23/095 |
| 2017/0119967 | A1 * | 5/2017 | Witte | A61M 5/178 |
| 2018/0105449 | A1 * | 4/2018 | Wada | C03B 29/02 |
| 2018/0111867 | A1 * | 4/2018 | Inoue | C03B 32/00 |
| 2018/0111868 | A1 * | 4/2018 | Moriuchi | C03B 32/00 |
| 2018/0134603 | A1 * | 5/2018 | Inoue | C03C 23/007 |
| 2019/0135685 | A1 * | 5/2019 | Shibata | A47G 19/02 |
| 2019/0233320 | A1 * | 8/2019 | Nicholas | C03B 33/10 |
| 2020/0123038 | A1 * | 4/2020 | Jud | C03B 23/055 |
| 2020/0141878 | A1 * | 5/2020 | Lisman | G01N 21/95 |
| 2020/0147659 | A1 * | 5/2020 | Narvekar | B08B 9/0808 |
| 2020/0326127 | A1 * | 10/2020 | Honig | H05B 3/66 |
| 2021/0331962 | A1 * | 10/2021 | Zheng | C03B 33/06 |
| 2022/0234935 | A1 * | 7/2022 | Kashiwagi | C03B 37/01853 |
| 2022/0250970 | A1 * | 8/2022 | Wada | C03C 4/20 |
| 2022/0286204 | A1 * | 9/2022 | Ma | C03B 37/01211 |

FOREIGN PATENT DOCUMENTS

| | | |
|---|---|---|
| DE | 19812056 C1 | 10/1999 |
| GB | 785423 A * | 10/1957 ............ B65B 7/161 |
| JP | 62-246368 A | 10/1987 |
| JP | 2010243091 A | 10/2010 |
| JP | 2010269973 A | 12/2010 |
| JP | 2011-522685 A | 8/2011 |
| JP | 201360339 A | 4/2013 |
| WO | 2006123621 A1 | 11/2006 |
| WO | 2009/138231 A2 | 11/2009 |

* cited by examiner

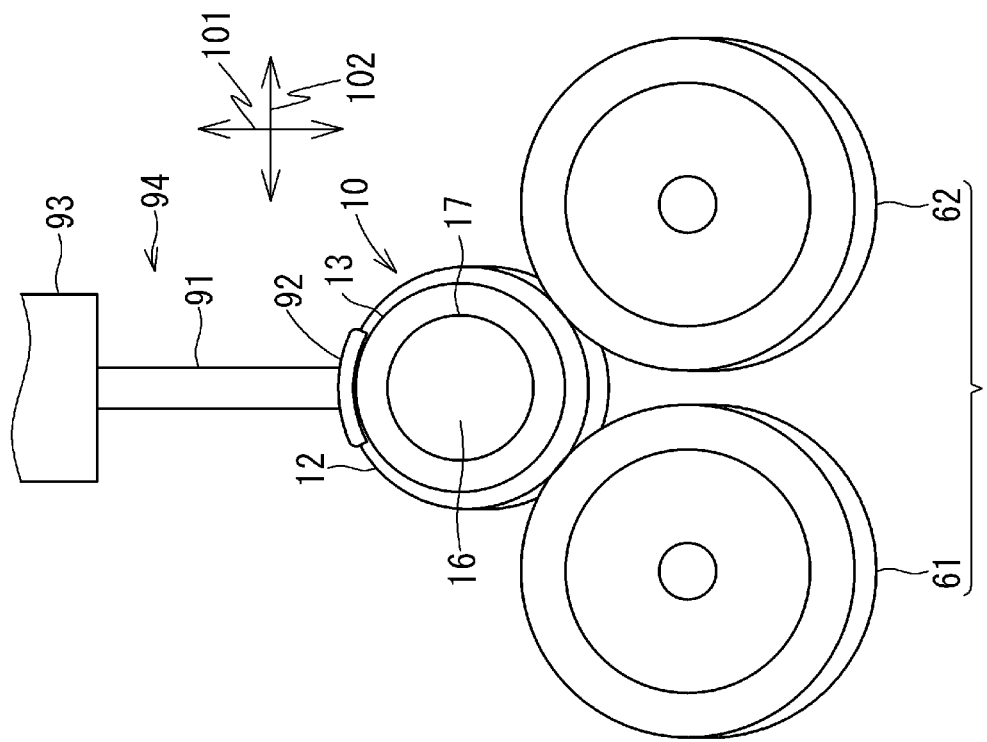
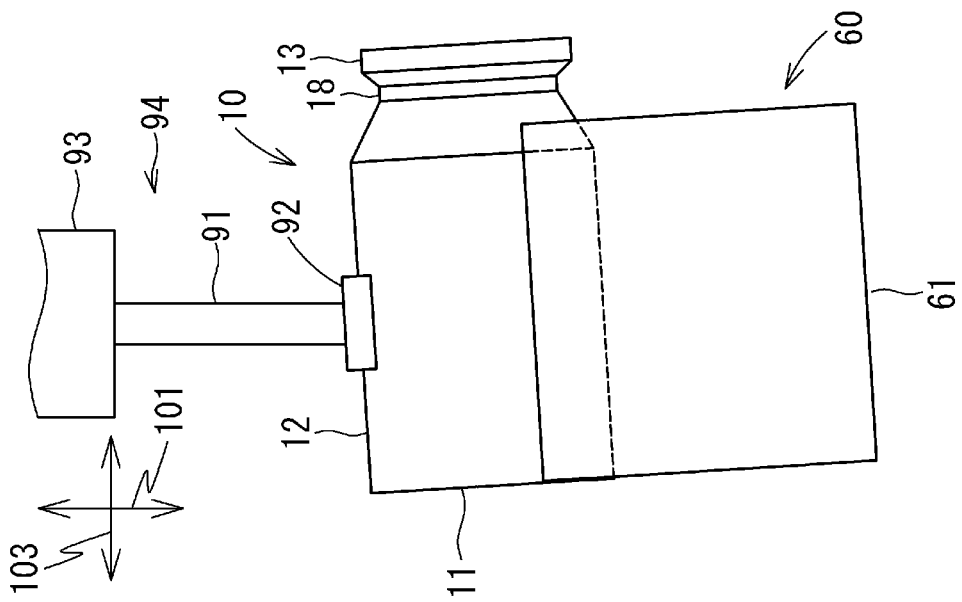

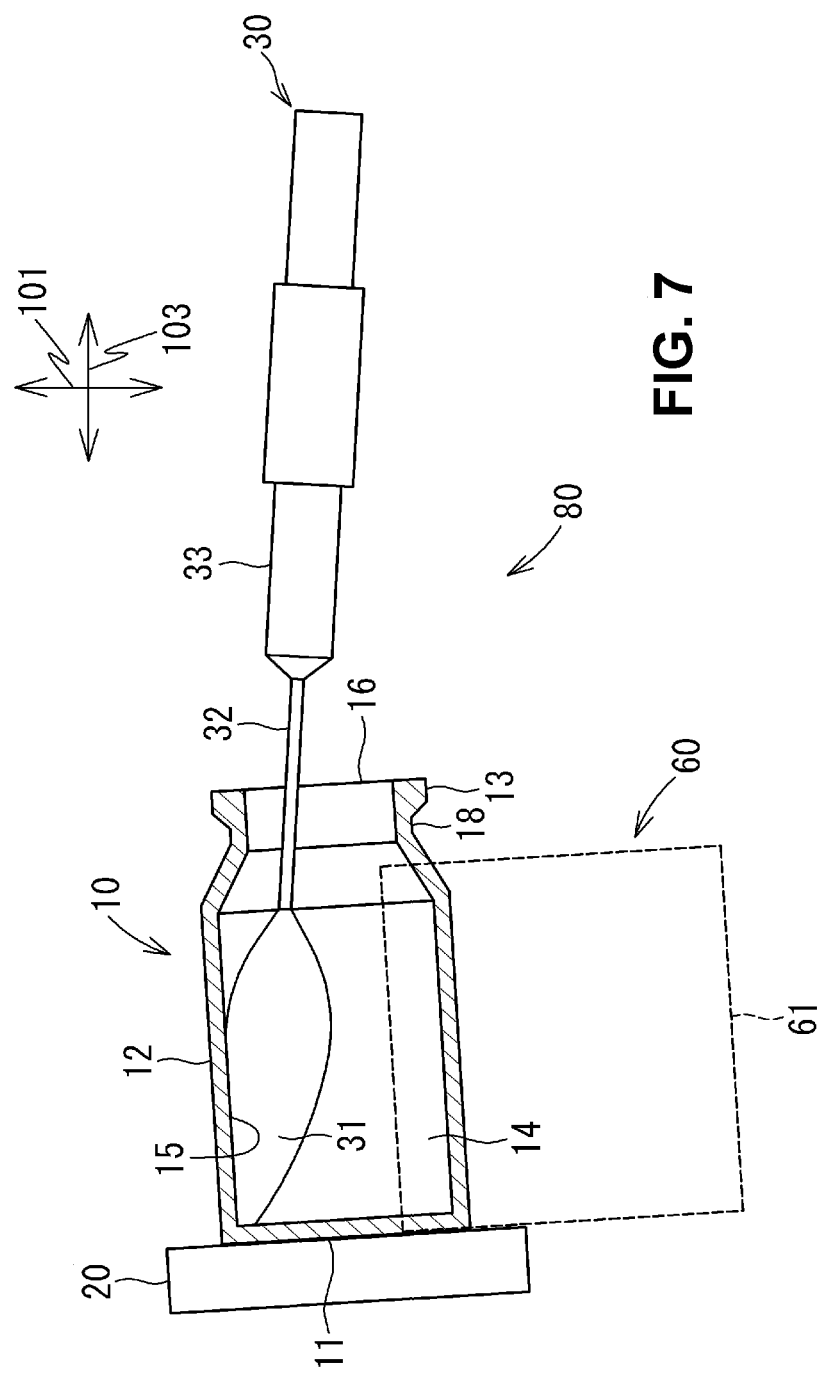

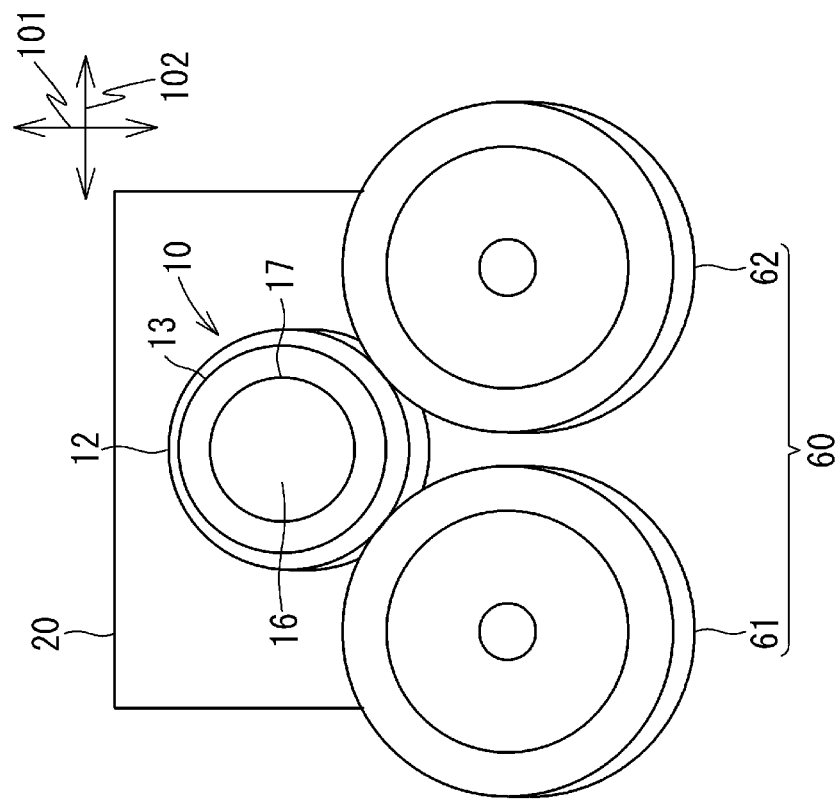
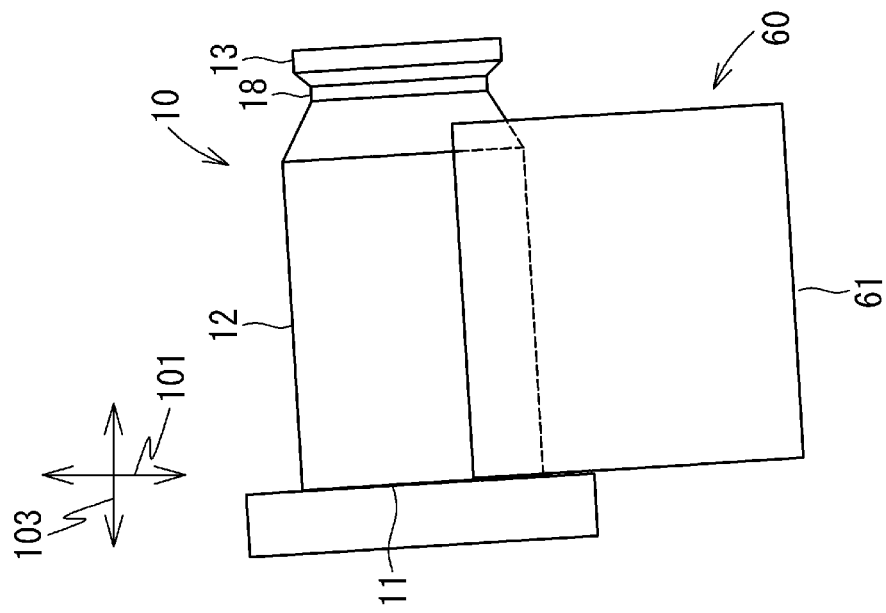
FIG. 8A
FIG. 8B

METHOD FOR MANUFACTURING MEDICAL GLASS CONTAINER AND FIRE BLAST DEVICE PROVIDED WITH ROTATOR

BACKGROUND OF THE INVENTION

The present invention relates to a method for manufacturing a medical glass container prevented from breakage and deformation and a fire blasting device.

Various kinds of borosilicate glass have been used for a medical vial. Mentioned are a low expansion type (Thermal expansion coefficient α: 32-33/° C.×$10^{-7}$) excellent in heat resistance, a medium expansion type (Thermal expansion coefficient α: 48-56/° C.×$10^{-7}$) excellent in chemical durability, a high expansion type (Thermal expansion coefficient α: 60-70/° C.×$10^{-7}$) excellent in low-temperature processability, and the like. Besides the borosilicate glass, soda lime glass has been used, and a large number of high expansion types (Thermal expansion coefficient α: 95/° C.×$10^{7}$) made from the soda lime glass. A glass for use in a medical vial is indicated as a material standard for a container for pharmaceutical agents or laboratory instruments in a pharmacopeia (USP37 or EP6.0), ASTM, JIS, and the like.

The heat resistance of the glass container depends on not only glass characteristics, such as thermal expansion coefficient, fracture strength, and elastic coefficient but the shape and the size of the container, glass uniformity, such as thickness, the surface state, and manufacturing conditions, such as annealing conditions. The heat-resistant temperature (Δt) of the glass as the physical properties depending on these conditions can be drawn as the physical quantity based on the following formula (I).

$$\Delta t = P(1-\sigma)/\alpha E \qquad \text{Formula (I)}$$

(Δt: Heat-resistant temperature, P: Fracture strength, σ: Poisson ratio, α: Thermal expansion coefficient, E: Elastic coefficient)
Further, a practical empirical formula (Formula (II)) shown below is derived from the experimental results by Volf.

$$\Delta t = 10000/\alpha \times 10^{-7} \qquad \text{Formula (II)}$$

As a result, it is known that the heat-resistant temperature is inversely proportional to the thermal expansion coefficient and substances having higher thermal expansion coefficient have lower Δt (heat-resistant temperature).

Among the borosilicate glass mentioned above, as a raw material of a medical glass container, such as a medical vial, a medium expansion type borosilicate glass excellent in chemical durability has been used in many cases. By heating and deforming a glass tube containing borosilicate glass, a mouth portion and a bottom portion of the vial are molded. When the borosilicate glass is heated, alkaline components contained in the borosilicate glass are volatilized. The volatilized alkaline components condense particularly on the inner surface near the bottom portion of the vial to generate a region deteriorated by processing. Such a region deteriorated by processing has a possibility of causing the elution of the alkaline components into a pharmaceutical agent and the like to be stored in the vial. To address the problem, the alkaline component of elution standard is established in ISO4802-1 or ISO4802-2 and the like.

As a method for reducing the elution of alkaline components, a method is known which includes subjecting a deteriorated glass generated in the inner surface of a vial molded from a glass tube to fire blasting with an oxygen-gas flame by a point burner while rotating the vial (Patent Literatures 1 and 2).

CITATION LIST

Patent Literatures

[Patent Literature 1] International Publication No. WO2006/123621
[Patent Literature 2] Japanese Unexamined Patent Application Publication No. 2010-269973

SUMMARY OF INVENTION

Technical Problem

In a fire blast process, a flame is applied to the inner surface in a side surface portion of a glass container. In order to uniformly apply the flame to the inner surface of the glass container, the glass container is rotated by a rotating device employing a roller or the like. Since the flame is applied to the inner surface of the glass container, the inner surface of the glass container is heated. The heat given to the inner surface of the glass container is transmitted to the circumferential portion of the glass container.

The flame applied to the inner surface of the glass container is required to have a temperature and spraying strength sufficient for removing a region deteriorated by processing. The glass container is easily expanded to be deformed by being heated to a high temperature. For example, when the rotating device rotating the glass container employs two disks facing each other with a space therebetween and rotates the two disks in a state where the glass container is placed in such a manner that the outer peripheral surface of the glass container partially contacts the outer peripheral surfaces of the two disks, there is a possibility that the outer peripheral surface of the glass container is likely to cause breakage, such as cracks, or deformation, such as distortion, in a portion not contacting the disks. Since the thermal conductivity of the glass is very poor as compared with that of metals, the temperature of a portion heated by the point burner becomes high, so that the portion expands. As a result, a compression stress arises. This is because a tensile stress arises in the facing surfaces of the glass wall.

In the fire blast process, the outer peripheral surface of the glass container contacts the roller and the like of the rotating device. The heat of the outer peripheral surface of the glass container is transmitted to the roller and the like. When the same roller is continuously used repeatedly, the heat is easily accumulated in the roller. The temperature of the roller in which the heat is accumulated becomes high, and therefore the glass container is heated also from the outside. The present inventors have found that, when the same roller is continuously used repeatedly, breakage, such as cracks, and deformation are likely to occur in the glass container.

The present invention has been made in view of the above-described circumstances. It is an object of the present invention to provide means and a fire blasting device which are difficult to cause breakage or deformation in a medical glass container in a method for manufacturing a medical glass container molded using borosilicate glass as a raw material.

Solution to Problem (1) A method for manufacturing a medical glass container according to the present invention includes a processing process of placing a glass container on the outer peripheral surface of each of a first roller and a second roller, which are disposed side by side in such a manner that the axis lines are parallel to each other, so that the axis line of the glass container is parallel to the axis lines of the first roller and the second roller and the entire outer peripheral surface corresponding to a region deteriorated by processing in the inner surface of the glass container is made to abut on the outer peripheral surface of each of the first roller and the second roller, and then applying a flame ejected from a point burner to the region deteriorated by processing in the inner surface of the glass container while rotating the glass container by rotating the first roller and the second roller around the axis lines.

The flame is applied to the region deteriorated by processing in the inner surface of the glass container. By the application of the flame, the region deteriorated by processing is removed and the glass container is heated. The glass container is supported by the outer peripheral surfaces of the first roller and the second roller. The outer peripheral surface of the glass container contacts, while rotating, the outer peripheral surfaces of the rotating first roller and second roller. Moreover, the outer peripheral surface corresponding to the region deteriorated by processing in the inner surface of the glass container abuts, while rotating, on the outer peripheral surface of each of the first roller and the second roller. More specifically, the heated portion of the glass container contacts, while rotating, the outer peripheral surfaces of the first roller and the second roller. Therefore, breakage and deformation of the heated portion in the side surface portion of the glass container are prevented.

(2) Preferably, the flame ejected from the point burner is scanned in the axial direction of the glass container while rotating the glass container in the processing process described above.

Thus, a range where the flame ejected from a point burner is directly applied to the glass container is widened in the axial direction, and therefore the region deteriorated by processing is eliminated over a wide range.

(3) Preferably, the outer peripheral surface having the largest diameter in the glass container is entirely made to abut on the outer peripheral surface of each of the first roller and the second roller.

Thus, the entire outer peripheral surface in the side surface portion of the glass container abuts on the outer peripheral surface of each of the first roller and the second roller, and therefore the deformation of the side surface portion of the glass container is further prevented.

(4) Preferably, with respect to the first roller and the second roller, the axis line of each of the first roller and the second roller tilts with respect to the horizontal direction so that the surface facing the point burner is located above the opposite surface.

Thus, the glass container supported by the outer peripheral surfaces of the first roller and the second roller is supported so that the opening of the glass container faces upward with respect to the horizontal direction, and therefore the glass container is maintained at a stable position without moving in the horizontal direction.

(5) Preferably, an abutment member abutting on the bottom surface of the glass container is made to abut on the bottom surface of the glass container placed on the outer peripheral surface of each of the first roller and the second roller to position the glass container with respect to a direction along the axis lines of the first roller and the second roller.

Thus, the movement of the glass container to the bottom surface side is regulated by the flame ejected from the point burner.

(6) Preferably, members forming at least the outer peripheral surface of each of the first roller and the second roller have heat dissipation performance higher than that of stainless steel.

Thus, the heat transmitted from the side surface portion of the glass container to the first roller and the second roller can be more rapidly dissipated than stainless steel.

(7) Preferably, the members forming at least the outer peripheral surface of each of the first roller and the second roller contain graphite.

(8) Preferably, the abutment member has heat dissipation performance higher than that of stainless steel.

Thus, the heat transmitted from the side surface portion of the glass container to the abutment member can be rapidly dissipated than stainless steel.

(9) Preferably, the abutment member contains graphite.

(10) Preferably, the processing process is performed two or more times while replacing the glass container to be placed on the outer peripheral surface of each of the first roller and the second roller.

Thus, the glass container can be continuously manufactured, and therefore a high-quality medical glass container can be mass produced.

(11) Preferably, the flame ejected from the point burner has heating power allowing the removal of the region deteriorated by processing formed in the inner surface of the glass container.

(12) A fire blasting device for a medical glass container according to the present invention has a first roller rotatable around the axis line, a second roller which is disposed so that the axis line is parallel to the axis line of the first roller and which is rotatable around the axis line, and a point burner which is disposed facing one end of each of the first roller and the second roller, the tip of which is located above the first roller and the second roller, and which can eject a flame from the tip of the point burner, in which the distance of the closest portion between the outer peripheral surface of each of the first roller and the second roller is smaller than the outer diameter of the glass container placed on the outer peripheral surface of each of the first roller and the second roller, the length in the axial direction of each of the first roller and the second roller is longer than the length in the axial direction of the outer peripheral surface corresponding to the region deteriorated by processing in the inner surface of the glass container, and the tip of the point burner is movable between a standby position in the outside of the glass container and a position which is located in the internal space of the glass container and faces the region deteriorated by processing in the inner surface of the glass container.

By the application of the flame to the region deteriorated by processing in the inner surface of the glass container, the region deteriorated by processing is removed. Simultaneously, the directly heated portion in the glass container is supported by the outer peripheral surfaces of the first roller and the second roller. The outer peripheral surface of the glass container contacts, while rotating, the outer peripheral surfaces of the rotating first roller and the second roller. Therefore, the deformation of the heated portion in the side surface portion of the glass container is prevented.

(13) Preferably, the length in the axial direction of each of the first roller and the second roller is longer than the length in the axial direction of the entire outer peripheral surface having the largest diameter in the glass container.

Thus, the entire outer peripheral surface having the largest diameter of the glass container abuts on the outer peripheral surface of each of the first roller and the second roller, and therefore the deformation of the side surface portion of the glass container is further prevented.

(14) Preferably, an abutment member is further provided which is disposed so as to face the other ends of the first roller and the second roller and project upward from the first roller and the second roller and in which at least a portion abutting on the bottom portion of the glass container in the surface on the side of the first roller and the second roller has a flat surface.

Thus, the movement of the glass container to the bottom surface side is regulated by the flame ejected from the point burner.

(15) Preferably, the heat dissipation performance of members forming at least the outer peripheral surfaces of the first roller and the second roller is higher than that of stainless steel.

Thus, the heat transmitted from the side surface portion of the glass container to the first roller and the second roller can be more rapidly dissipated than stainless steel.

(16) Preferably, the members forming at least the outer peripheral surfaces of the first roller and the second roller contain graphite.

(17) Preferably, the abutment member has heat dissipation performance higher than that of stainless steel.

Thus, the heat transmitted from the side surface portion of the glass container to the abutment member can be more rapidly dissipated than stainless steel.

(18) Preferably, the abutment member contains graphite.

(19) Preferably, a rotation control unit capable of controlling the number of rotations of the roller pair and arbitrarily changing the number of rotations is further provided.

By the adjustment of the number of rotations of the roller pair, a temperature difference between the temperature of a portion abutting on the flame ejected from the point burner and the temperature of the other portion is within a desired range in the inner surface of the glass container in the fire blast process.

(20) Preferably, a plurality of roller pairs containing the first roller and the second roller, two or more of the point burners corresponding to the roller pairs, and a vial replacing device capable of replacing the glass container placed on the roller pair with another glass container are further provided and each roller pair is disposed side by side so that the axis lines of all the rollers are parallel to each other.

Glass containers can be continuously manufactured while replacing a glass container with other glass containers by a vial replacing device. Moreover, since the plurality of roller pairs are simultaneously used, the glass container can be mass produced.

Advantageous Effects of Invention

According to the present invention, the heated portion of the glass container contacts, while rotating, the outer peripheral surfaces of the first roller and the second roller in the fire blasting. Therefore, a medical glass container prevented from breakage and deformation can be manufactured using borosilicate glass as a raw material.

BRIEF DESCRIPTION OF DRAWINGS

In FIG. 1, a roller pair 60 and a vial 10 at a vial placement position P1 are illustrated by the solid lines and the roller pair 60 and the vial 10 moved to a fire blast position P2 and a vial removal position P3 and the roller pair 60 and the vial 10 during the movement from the vial removal position P3 to the vial installation position P1 are individually illustrated by the dashed lines.

FIG. 2 also illustrates a roller pair rotating mechanism 70 for rotating the roller pair 60.

In FIG. 3, a vial replacing device 90 is omitted.

In FIG. 4, the vial replacing device 90 is omitted.

FIG. 5(A) and FIG. 5(B) are views for explaining the usage state of a vial moving device 94 and illustrate the state where a carrying portion 92 is made to abut on the vial 10 placed on the outer peripheral surfaces of the roller pair 60.

FIG. 7 is a view illustrating a point burner 30, for example, in fire blasting.

FIG. 8(A) and FIG. 8(B) are views for explaining the usage state of the roller pair 60 and the abutment member 20.

DESCRIPTION OF EMBODIMENT

Hereinafter, a preferable embodiment of the present invention is described. This embodiment is merely one embodiment of the present invention. It is a matter of course that the embodiment can be altered in the range where the scope of the present invention is not altered.

[Outline of Fire Blasting Device 80]

Figure 1:
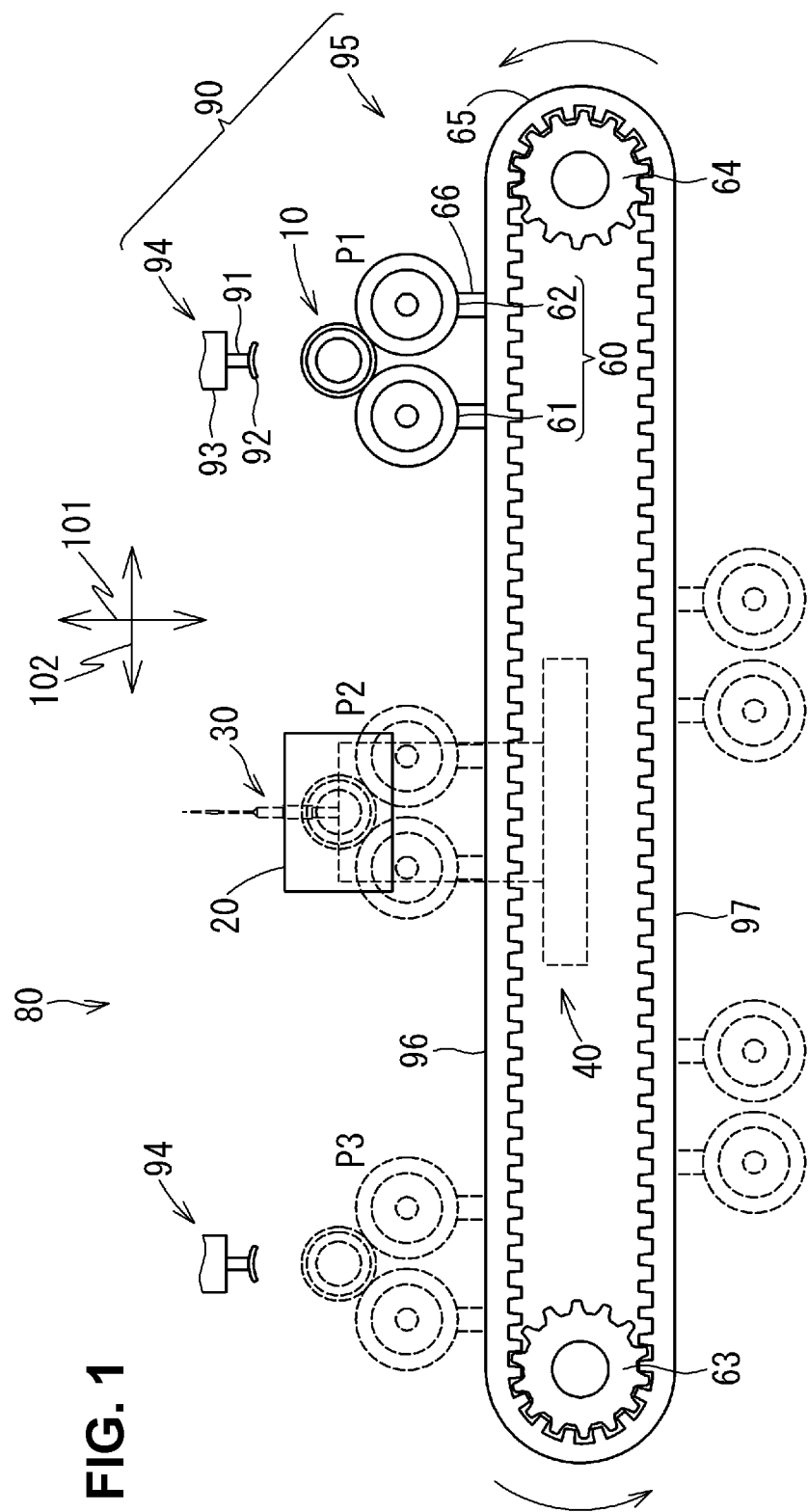
FIG. 1 is a schematic view of a fire blasting device 80 according to an embodiment of the present invention.

A fire blasting device 80 is a device for performing fire blasting to a vial 10 (equivalent to the glass container of the present invention). As illustrated in FIG. 1, the fire blasting device 80 has a vial replacing device 90, a point burner 30, a point burner moving device 40, a roller pair 60, and an abutment member 20. In FIG. 1, the point burner 30 and the point burner moving device 40 are illustrated by the dashed lines. In the following description, a vertical direction 101 is defined on the basis of the upper and lower sides in FIG. 1, a left and right direction 102 is defined on the basis of the left and right direction of the sheet of FIG. 1, and a forward and backward direction 103 is defined as a direction perpendicular to the vertical direction 101 and the left and right direction 102, i.e., a direction perpendicular to the sheet of FIG. 1.

Figure 3:
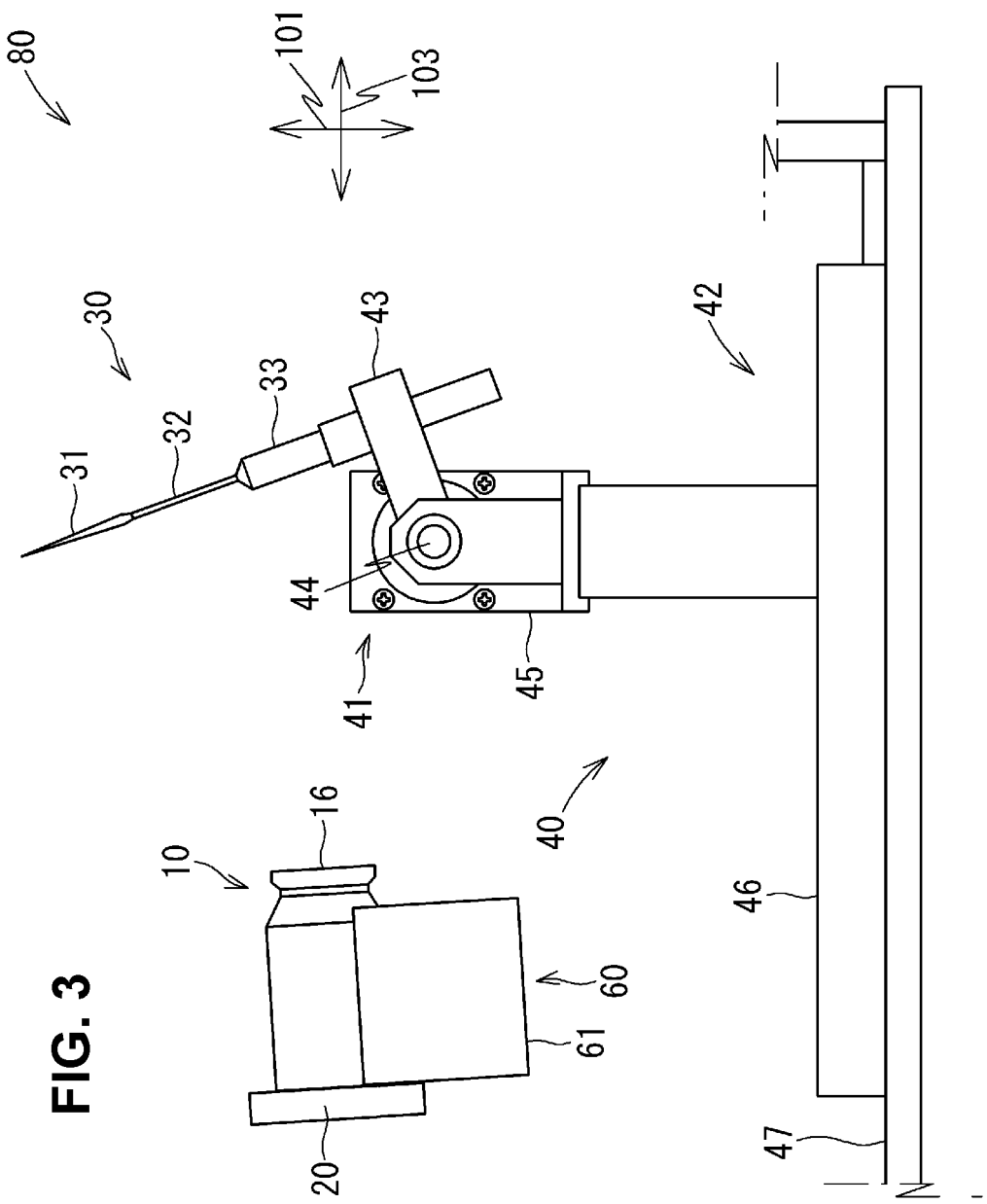
FIG. 3 illustrates the fire blasting device 80 according to the embodiment of the present invention and is a schematic view of the fire blasting device 80 in the state where a point burner 30 is located at a standby position.
Figure 4:
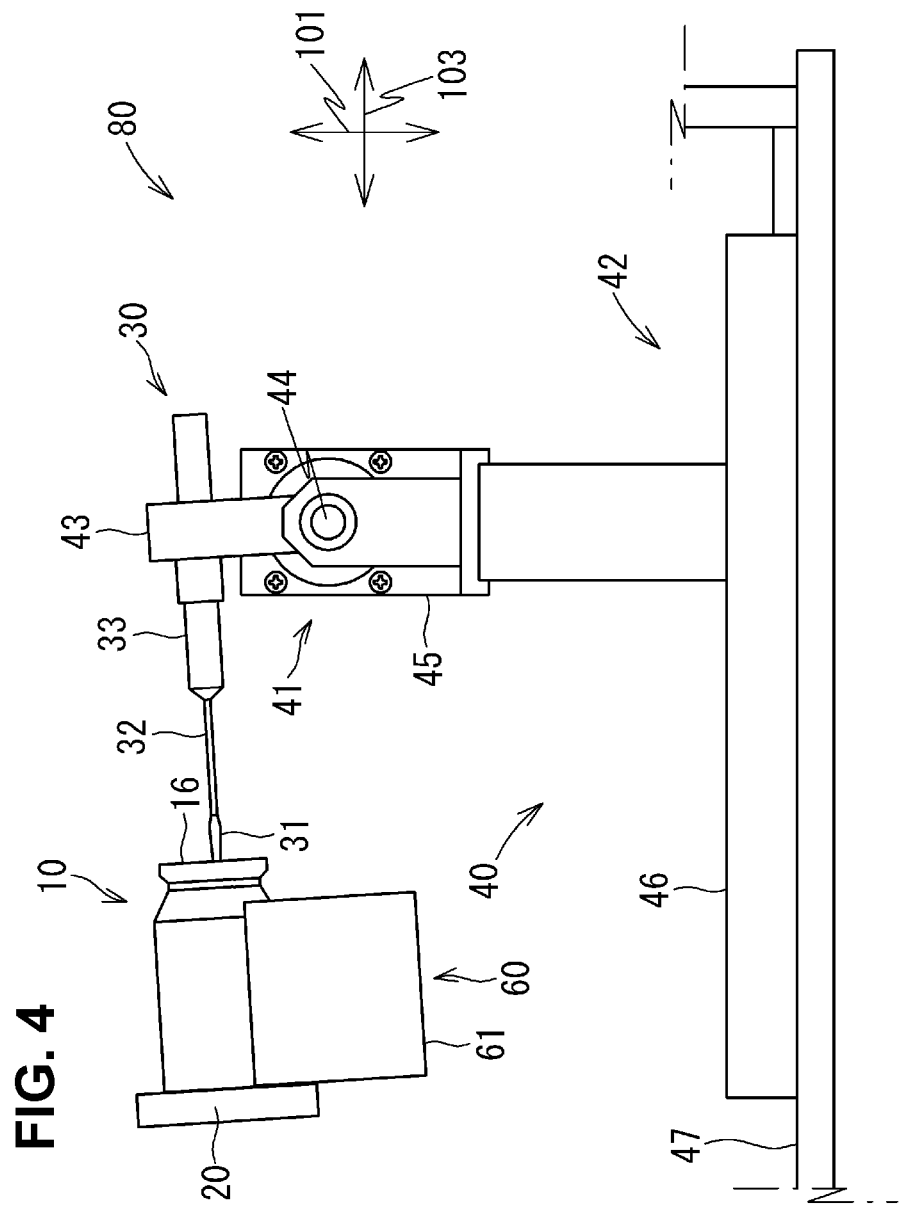
FIG. 4 illustrates the fire blasting device 80 according to the embodiment of the present invention and is a schematic view of the fire blasting device 80 in the state where the point burner 30 is located at a slide position.
Figure 6B:
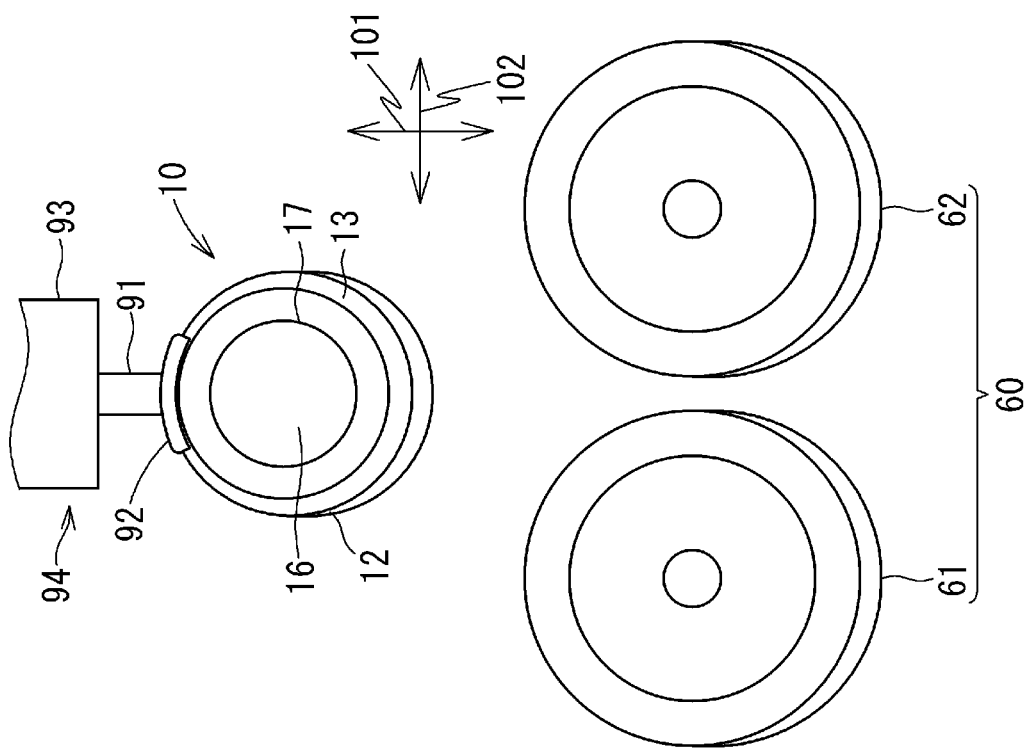
FIG. 6(A) and FIG. 6(B) are views for explaining the usage state of the vial moving device 94 and illustrate the state where the vial 10 on which the carrying portion 92 is abutted is moved upward from the outer peripheral surfaces of the roller pair 60.
Figure 6A:
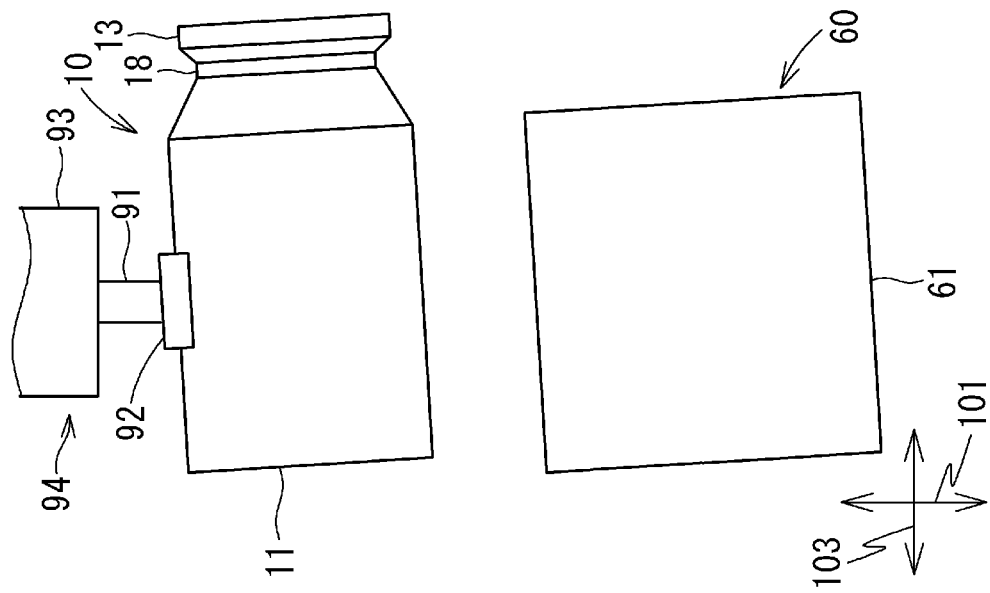

As illustrated in FIG. 1, the fire blasting device 80 has the point burner 30, the point burner moving device 40, and the abutment member 20 around the center in the left and right direction 102. The point burner 30 and the point burner moving device 40 are located forward relative to the abutment member 20 with respect to the forward and backward direction 103 (FIG. 3). More specifically, as illustrated in FIG. 3 and FIG. 4, the point burner 30 and the point burner moving device 40 are disposed forward with respect to the forward and backward direction 103 so as to be spaced apart from the abutment member 20.

The vial replacing device 90 is located backward relative to the point burner 30 with respect to the forward and backward direction 103. In FIG. 1, the point burner 30 and the point burner moving device 40 located in front of the vial replacing device 90, the roller pair 60, and the abutment member 20 are illustrated by the dashed lines. A roller pair moving device 95 extends in the left and right direction 102 in the lower side of the vial replacing device 90 and backward relative to the point burner 30. As described in detail below, the roller pair moving device 95 can move the roller pair 60 along the circumferential track and the roller pair moving device 95 rotatably supports the roller pair 60, for example. Although one roller pair 60 is illustrated in this embodiment, two or more of the roller pairs 60 may be supported by the roller pair moving device 95. The vial moving device 94 is provided in the upper side of the vial replacing device 90 and in the left and right direction 102 of the point burner 30. Hereinafter, constituent components of the fire blasting device 80 are described in detail.

[Vial Replacing Device 90]

The vial replacing device 90 is an example of the replacing device. As illustrated in FIG. 1, the vial replacing device 90 has the roller pair moving device 95 and the vial moving device 94.

As illustrated in FIG. 1, the roller pair moving device 95 has a belt 65 which rotates the roller pair 60 along the circumferential track having an oblong shape in a direction (left and right direction 102) crossing the axial direction. The belt 65 having an endless annular shape is wound around two belt pinion gears 63 and 64 disposed to be spaced apart from each other in the left and right direction 102. The inner circumference of the belt 65 has irregularities shape so as to be able to be engaged with the teeth of the belt pinion gears 63 and 64. By the transmission of drive from a driving source (not illustrated) to one of the belt pinion gears 63 and 64, the one of the belt pinion gears 63 and 64 rotates, and then the rotation is transmitted to the belt 65.

Figure 2:
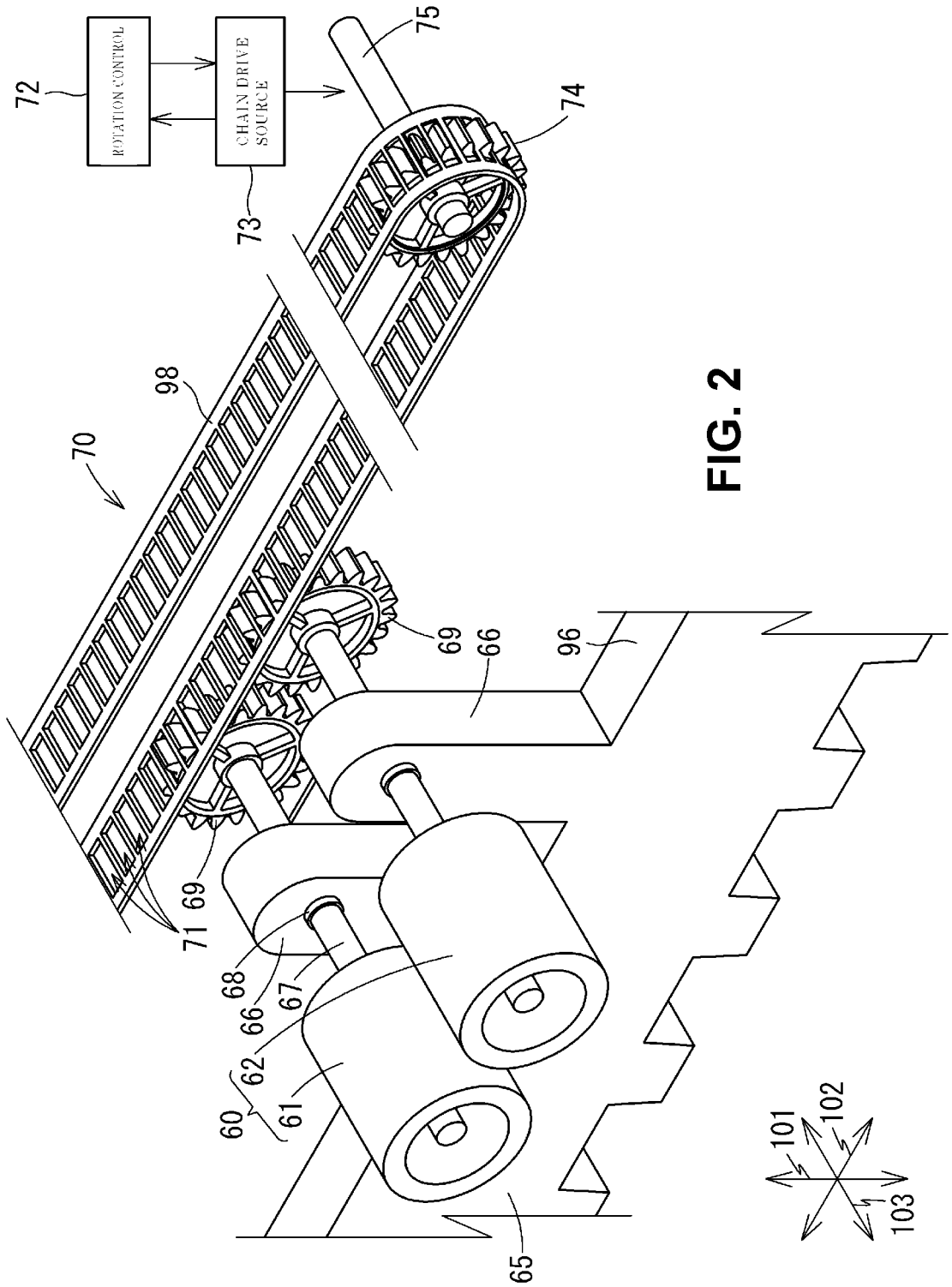
FIG. 2 is an enlarged perspective view of a part (around the fire blast position P2) of a roller pair moving device 95 according to the embodiment of the present invention.

As illustrated in FIG. 1 and FIG. 2, the outer peripheral surface of the belt 65 has projection portions 66 projected outward in the radial direction of the annular belt 65. The projection portions 66 form one pair and are disposed to be spaced apart from each other in a direction in which the belt 65 extends. The projection portions 66 each have a throughhole penetrating in a state of being tilted with respect to the horizontal direction (forward and backward direction 103), and a bearing 68 is inserted into each through-hole. Each roller shaft 67 of the roller pair 60 is inserted into and passed through and pivotally supported by the bearing 68 in a state of being tilted with respect to the horizontal direction (forward and backward direction 103). Therefore, the axis line of each roller shaft 67 of the roller pair 60 tilts with respect to the horizontal direction (forward and backward direction 103) so that the front side in the forward and backward direction 103 is located above the backside. The axis line of each roller shaft 67 of the roller pair 60 tilts by 0 to 10° with respect to the horizontal direction (forward and backward direction 103). To the front side in the forward and backward direction 103 of the roller shaft 67, the first roller 61 or the second roller 62 are individually fixed. Each projection portion 66 is rotated with the belt 65.

As illustrated in FIG. 1, the vial moving device 94 is disposed above the roller pair 60 and is disposed on each of the left side and the right relative to the point burner 30. The vial moving device 94 has an arm support portion 93, a carrying portion 92, and an arm 91. The upper end of the arm 91 is connected to the arm support portion 93. The carrying portion 92 is provided on the lower end of the arm 91.

The arm support portion 93 is disposed above the roller pair 60 so as to be movable in the forward and backward direction 103. The arm support portion 93 is movable to an arbitrary position in the forward and backward direction 103 by the driving force from the driving source (not illustrated). The arm 91 is a rod-like member extending downward from the arm support portion 93 along the vertical direction 101. By the input of the driving force from the driving source (not illustrated), the arm 91 is extendable and contractible downward with respect to the arm support portion 93. The carrying portion 92 has a curved plate shape in which the inner surface is dented upward. Although not illustrated in each figure in detail, an opening generating suction pressure is formed in the inner surface side of the carrying portion 92. By the generation of suction pressure in a state where the inner surface of the carrying portion 92 contacts the outer peripheral surface of the vial 10, the carrying portion 92 supports the vial 10 so as to be able to be lifted upward from the roller pair 60.

[Point Burner 30]

As illustrated in FIG. 1, the point burner 30 is disposed at a position where the point burner 30 faces the abutment member 20 at the center in the left and right direction 102 in the fire blasting device 80. As illustrated in FIG. 3 and FIG. 4, the point burner 30 has a burner body 33 and a nozzle 32 and is connected to a cylinder and a flow control device (not illustrated).

The burner body 33 has an approximately cylindrical shape and flow passages through which inflammable gas, such as liquefied natural gas, and oxygen can individually flow and a flow passage through which a mixed gas, which is formed by joining of the flow passages, can flow are formed in the internal space. The burner body 33 is connected to each of a cylinder storing the inflammable gas and a cylinder storing the oxygen on the base end side. Between the burner body 33 and each cylinder, a flow rate control device (not illustrated) for controlling each of the inflammable gas flow rate and the oxygen flow rate is provided. A known device can be used for the flow rate control device.

The nozzle 32 is connected to the tip side of the burner body 33. The nozzle 32 has a straw shape and allows the mixed gas flowing out of the burner body 33 to pass therethrough. The outer diameter of the nozzle 32 is designed to have a thickness which allows the insertion of the nozzle 32 into an internal space 14 of the vial 10 and which allows the variation of the axial direction of the nozzle 32 in a state where the tip of the nozzle 32 is located in the internal space 14 of the vial 10. More specifically, the outer diameter of the nozzle 32 is sufficiently smaller than the internal diameter of a neck portion 18 of the vial 10. The length in the axial direction of the nozzle 32 is sufficiently larger than the length along the axial direction of the vial 10. As a raw material of the nozzle 32, one having high heat resistance, such as ceramic, is preferable, for example.

The mixed gas is caused to flow out to the outside from the tip of the nozzle 32, which is the tip of the point burner 30, through the internal space of the nozzle 32 from the internal space of the burner body 33. Due to the fact that the mixed gas flowing out to the outside from the tip of the nozzle 32 is ignited, a flame 31 is ejected from the tip of the point burner 30. The heating power of the flame 31 ejected from the tip of the point burner 30 is controllable by controlling the flow rate of each of the gas and the oxygen by the flow rate control device. The strength of the heating power is generally defined by the quantity of heat per hour (kcal/h).

[Point Burner Moving Device 40]

The point burner moving device 40 is a device for moving the point burner 30 relatively to the vial 10. As illustrated in FIG. 1, the point burner moving device 40 is substantially disposed at a position which is located below the point burner 30 and where the point burner moving device 40 faces the abutment member 20 at the center in the left and right direction 102 in the fire blasting device 80. As illustrated in FIG. 3 and FIG. 4, the point burner moving device 40 has a rotating device 41, a sliding device 42, and a burner support portion 43.

The rotating device 41 has a rotation shaft 44, a rotation shaft support portion 45, and a driving device for rotation (not illustrated). The rotation shaft 44 is rotatably supported by the rotation shaft support portion 45 with the axial direction along the left and right direction 102. The burner support portion 43 is fixed to the rotation shaft 44. The point burner 30 is connected to the rotation shaft 44 through the burner support portion 43. By the rotation of the rotation shaft 44, the point burner 30 rotates around the rotation shaft 44 together with the burner support portion 43. Although not illustrated in the figures, driving force is input into the rotation shaft 44 from the driving source, such as a stepping motor. By controlling the rotation direction and the rotation amount of the driving source, the point burner 30 is rotated to a desired rotating position.

The sliding device 42 has a slide portion 46, a slide portion support base 47, and a drive device for sliding (not illustrated). The slide portion 46 is placed on the upper surface of the slide portion support base 47 so as to be slidable in the forward and backward direction 103. Although not illustrated in detail in each figure, a guide along the forward and backward direction 103 is provided on the upper surface of the slide portion support base 47, and the slide portion 46 is guided in the forward and backward direction 103 by the guide. Driving force is input into the slide portion 46 from the driving source, such as a stepping motor. Due to the fact that the direction in the forward and backward direction 103 and the drive amount of the driving force to be supplied from the driving source are controlled, the slide portion 46 is slid to an arbitrary position with respect to the forward and backward direction 103. With the slide of the slide portion 46, the rotation shaft support portion 45 and the point burner 30 move.

The position of the point burner 30 illustrated in FIG. 3 is a standby position. At the standby position, the point burner 30 is located in an approximately right direction in FIG. 3 relative to the rotation shaft 44 and is located at a position distant from the vial 10. The flame 31 ejected from the tip of the nozzle 32 of the point burner 30 approximately faces upward and is located at a position where the flame 31 does not contact the vial 10. By the counterclockwise rotation of the rotation shaft 44, the point burner 30 is movable to a slide position illustrated in FIG. 4. At the position illustrated in FIG. 4, the axial direction of the point burner 30 tilts with respect to the horizontal direction (forward and backward direction 103). With respect to the tip of the nozzle 32 of the point burner 30, the axis line tilts with respect to the horizontal direction (forward and backward direction 103) so that the tip of the nozzle 32 of the point burner 30 is located below the base end side. The axis line of the nozzle 32 tilts by 0 to 10° with respect to the horizontal direction (forward and backward direction 103). The tip of the nozzle 32 of the point burner 30 is located at a position where the tip of the nozzle 32 of the point burner 30 faces the opening 16 of the vial 10 in the outside of the vial 10. By the clockwise rotation of the rotation shaft 44 from the slide position, the point burner 30 is movable to the standby position from the slide position.

[Roller Pair 60]

As illustrated in FIG. 2, the roller pair 60 is rotatably supported by roller shafts 67 in the roller pair moving device 95. As illustrated in FIG. 8(A) and FIG. 8(B), the roller pair 60 has a pair of the first roller 61 and the second roller 62. The first roller 61 and the second roller 62 are disposed side by side along the left and right direction 102 in a state where the rotation shafts tilt with respect to the horizontal direction (forward and backward direction 103). Each axis line of the roller pair 60 tilts with respect to the horizontal direction so that the surface facing the point burner 30 is located above the opposite surface. The axis lines of the roller pair 60 tilt by 0 to 10° with respect to the horizontal direction (forward and backward direction 103). It is preferable that the first roller 61 and the second roller 62 have the same size. The length in the axial direction of the first roller 61 and the second roller 62 is longer than the length in the axial direction in the side surface portion 12 of the vial 10. It is preferable that the length in the axial direction of the first roller 61 and the second roller 62 is at least the length including the entire outer peripheral surface of the vial 10 corresponding to a region deteriorated by processing in the inner surface 15 of the vial 10. The outer peripheral surface of each of the first roller 61 and the second roller 62 can abut on the outer peripheral surface of the vial 10 corresponding to the region deteriorated by processing to be heated. It is more preferable that the length in the axial direction of the first roller 61 and the second roller 62 is equal to or larger than the length in the axial direction of the vial 10. The interval between the first roller 61 and the second roller 62, i.e., the distance of the closest portion between the outer peripheral surface of each of the interval 61 and the second roller 62, is sufficiently narrower than the outer diameter of the vial 10. The roller pair 60 is rotated by a roller pair rotating mechanism 70 described below.

As illustrated in FIG. 2, the roller pair rotating mechanism 70 is disposed at a position where the roller pair 60 faces the point burner 30 in the forward and backward direction 103. The roller pair rotating mechanism 70 has a rotation control unit 72, a chain driving source 73, chain pinion gears 74, a chain 98, and roller shaft pinion gears 69. The chain driving source 73 is mutually connected to the rotation control unit 72. The chain driving source 73 is connected to the chain pinion gear 74 through a driving shaft 75 which is the rotation shaft of the chain pinion gear 74. Although partially illustrated in FIG. 2, the chain 98 is an annular endless belt which rotates along the circumferential track which is oblong in the left and right direction 102. The width in the left and right direction 102 of the chain 98 is the same as the position where the roller pair 60 faces the point burner 30 (fire blast position P2 described later). More specifically, the chain 98 is extended in the left and right direction 102 at the position where the roller pair 60 faces the point burner 30. The chain 98 is wound around the two chain pinion gears 74 disposed to be spaced apart from each other in the left and right direction 102. Through-holes 71 capable of being engaged with the teeth of each roller shaft pinion gear 69 and each chain pinion gear 74 are formed at a fixed interval in the chain 98. The roller shaft pinion gears 69 are fixed to the backside in the forward and backward direction 103 of the two roller shafts 67 in a state where each rotation axis is parallel to the roller pair 60. When the roller pair 60 is located at a position where the roller pair 60 faces the point burner 30, the roller shaft pinion gears 69 are engaged with the through-holes 71 of the chain 98.

The rotation control unit 72 controls the chain driving source 73. For the chain driving source 73, a three phase alternating current motor or a direct-current motor capable of controlling PWM is used, for example. A drive current is transmitted to the chain driving source 73 by the rotation control unit 72. The chain driving source 73 rotates at the number of rotations according to the drive current. Therefore, the rotation control unit 72 controls the current given to the chain driving source 73 from a power supply based on the detection value from a sensor detecting the number of rotations of the chain driving source 73 or the number of rotations of the roller pair 60, whereby the rotation control unit 72 can arbitrarily vary the number of rotations of the chain driving source 73 and the number of rotations of the roller pair 60. The rotation of the chain driving source 73 is transmitted to the chain pinion gear 74 through the driving shaft 75.

By the transmission of the rotation power to one of the two chain pinion gears 74 from the chain driving source 73, one of the chain pinion gear 74 rotates, and then the rotation is transmitted to the chain 98. When the roller pair 60 is located at the position where the roller pair 60 faces the point burner 30, the chain 98 is engaged with the roller shaft pinion gears 69. The rotation of the chain 98 is transmitted to the roller shaft pinion gears 69, and, as a result, the first roller 61 and the second roller 62 rotate. One rotating the roller shaft pinion gears 69 is not limited to the chain pinion gears 74 and the chain 98, and any substance is used insofar as the roller shaft pinion gears 69 are synchronously rotated.

A member forming at least the outer peripheral surface of each of the first roller 61 and the second roller 62 has heat dissipation performance higher than that of stainless steel. Thus, when the first roller 61 and the second roller 62 are continuously used for fire blasting, the heat given to the outer peripheral surface of each of the first roller 61 and the second roller 62 is more easily dissipated than stainless steel. As a member forming each outer peripheral surface, those containing graphite, aluminum alloy, or brass are mentioned, for example. Graphite has heat resistance and thermal conductivity and has durability also against rapid thermal changes. Therefore, the first roller 61 and the second roller 62 easily dissipate the transmitted heat to the outside.

[Abutment Member 20]

As illustrated in FIG. 8(A) and FIG. 8(B), the abutment member 20 is provided on the side opposite to the point burner 30 in the forward and backward direction 103 with respect to the roller pair 60. Above the roller pair 60, the point burner 30 is disposed in front of the roller pair 60 and the abutment member 20 is provided on the backside of the roller pair 60. The abutment member 20 is projected upward from the outer peripheral surfaces of the roller pair 60. The abutment member 20 is a rectangular flat plate which is thin in the forward and backward direction 103 and flatly extends in the vertical direction 101 and the left and right direction 102 and tilts in the forward and backward direction 103 with the tilt with respect to the horizontal direction of the roller pair 60. The abutment member 20 is molded so that the surface on the side of the roller pair 60 is flat.

The abutment member 20 has heat dissipation performance higher than that of stainless steel. Thus, when the abutment member 20 is continuously used for fire blasting, the heat given to the abutment member 20 is more easily dissipated than stainless steel. As a member forming each outer peripheral surface, those containing graphite, aluminum alloy, or brass are mentioned, for example.

The abutment member 20 can abut on the bottom portion 11 of the vial 10 placed on the roller pair 60. The bottom portion of the vial 10 placed on the roller pair 60 is positioned by the abutment member 20 in the forward and backward direction 103.

[Vial 10]

The vial 10 is an example of the medical glass container. As illustrated in FIG. 3 to FIG. 8, the vial 10 is a container having an approximately cylindrical outside shape with a closed bottom and has the bottom portion 11, a side surface portion 12, the neck portion 18, and the mouth portion 13 in order from the left side. The vial 10 has the internal space 14 and opens in the edge portion 17 of the mouth portion 13. The bottom portion 11 has a flat disk shape and is continuous to the side surface portion 12 in the edge of the bottom portion 11. The side surface portion 12 has a cylindrical shape. In the side surface portion 12, the outer diameter and the inner diameter are molded to be a fixed diameter in the axial direction. The neck portion 18 is continuous to the side surface portion 12 and narrows in a tapered shape from the side surface portion 12. The inner diameter and the outer diameter of the neck portion 18 are molded to be narrower than those of the side surface portion 12. The mouth portion 13 is continuous to the neck portion 18 and has the opening 16 defined by the edge portion 17. The inner diameter and the outer diameter of the mouth portion 13 are molded to be narrower than those of the side surface portion 12. The outer diameter of the mouth portion 13 is molded to be wider than that of a portion which is molded to be the narrowest in the outer diameter of the neck portion 18. Therefore, in the vial 10, the outer diameter of the side surface portion 12 is the largest. More specifically, the outer peripheral surface of the side surface portion 12 has the largest diameter in the vial 10.

As illustrated in FIG. 8(A) and FIG. 8(B), the vial 10 is disposed on the outer peripheral surfaces of the roller pair 60. As described above, the axis lines of the roller pair 60 are disposed side by side along the left and right direction 102 in the state of being tilted with respect to the horizontal direction (forward and backward direction 103). Therefore, the axial direction of the vial 10 supported by the outer peripheral surfaces of the first roller 61 and the second roller 62 tilts with respect to the horizontal direction (forward and backward direction 103). The vial 10 opens upward with respect to the horizontal direction. The side surface portion 12 of the vial 10 contacts the outer peripheral surface of each of the first roller 61 and the second roller 62. More specifically, the entire side surface portion 12 which is the outer peripheral surface having the largest diameter of the vial 10 abuts, while rotating, on the outer peripheral surface of each of the first roller 61 and the second roller 62. As illustrated in FIG. 8(B), the vial 10, the first roller 61, and the second roller 62 rotate in a state where one portion (region along the axial direction of the vial 10) in the circumferential direction of the side surface portion 12 of the vial 10 contacts one portion (region along the axial direction of the first roller 61) in the circumferential direction of the first roller 61 and another one portion (region along the axial direction of the vial 10) in the circumferential direction of the side surface portion 12 of the vial 10 contacts one portion (region along the axial direction of the second roller 62) in the circumferential direction of the second roller 62.

[Method for Manufacturing Vial 10]

A method for manufacturing the vial 10 mainly includes a container molding process and a fire blast process. The container molding process is a process of molding the vial 10 from a glass tube. The fire blast process is a process of applying the flame 31 ejected from the point burner 30 to a region deteriorated by processing in the inner surface 15 of the vial 10.

[Container Molding Process]

The vial 10 is molded by heating a glass tube, which is vertically held and rotates, using a common vertical molding device as an example. The glass tube is softened by being heated with a flame of a burner. Due to the fact that the glass tube is partially softened and deformed, the bottom portion 11 and the mouth portion 13 of the vial 10 are molded from the glass tube. When the bottom portion is molded, alkali borate and the like are volatilized from borosilicate glass as a raw material of the glass tube. Alkaline components, such as the volatilized alkali borate, adhere to the vicinity of the bottom portion 11 in the inner surface 15 of the vial 10 to generate a region deteriorated by processing. In order to remove the region deteriorated by processing, a fire blast process described in detail below is performed.

[Fire Blast Process]

As illustrated in FIG. 1 to FIG. 4, the fire blasting device 80 is used in the fire blast process.

The vial 10 is placed on the roller pair 60 in such a manner that the outer peripheral surface of the vial 10 contacts the outer peripheral surfaces of both the first roller 61 and the second roller 62. As illustrated in FIG. 1, the vial 10 is placed on the outer peripheral surfaces of the roller pair 60 by the vial moving device 94 at a position on the right side in the left and right direction 102 (hereinafter also referred to as a vial placement position P1) relative to the fire blasting device 80. When described in detail, the vial 10 to be subjected to fire blasting is disposed in either direction in the forward and backward direction 103 of the roller pair 60 at the vial placement position P1 in a state where an opening is directed forward beforehand. The arm support portion 93 of the vial moving device 94 is moved in the forward and backward direction 103 to above the vial 10. The arm 91 is extended toward the vial 10 and the vial 10 is stuck to the carrying portion 92. The arm 91 is contracted upward in the state where the vial 10 is stuck to the carrying portion 92. The arm support portion 93 is moved to above the roller pair 60 and the arm 91 is extended downward toward the roller pair 60, whereby the vial 10 abuts on the outer peripheral surfaces of the roller pair 60. By the release of the sticking of the vial 10 by the carrying portion 92, the vial 10 is placed on the outer peripheral surfaces of the roller pair 60.

As illustrated in FIG. 1, the roller pair 60 on which the vial 10 is placed is moved to a position (hereinafter also referred to as a fire blast position P2) at the center in the left and right direction 102 in the fire blasting device 80 by the roller pair moving device 95. More specifically, the roller pair 60 at the vial placement position P1 is moved to the left side in the left and right direction 102 of FIG. 1 by the roller pair moving device 95. The vial 10 placed on the roller pair 60 is moved to the position at the center in the left and right direction 102 of FIG. 1 where the vial 10 is subjected to fire blasting.

The outer peripheral surface of the vial 10, i.e., the outer peripheral surface of the side surface portion 12, contacts the outer peripheral surfaces of the roller pair 60. In this state, when the roller pair 60 is rotated in the same direction by the roller pair rotating mechanism 70 by the input of arbitrary number of rotations of the roller pair 60 into the rotation control unit 72, the vial 10 placed on the roller pair 60 is rotated around the axis line. The number of rotations (rpm) of the roller pair 60 is set as appropriate in consideration of the quantity of heat to be applied to the vial 10 in the fire blast process. For example, the number of rotations of the roller pair 60 is set in view of the relationship among the heating power of the flame 31 to be ejected from the point burner 30, the time of period while the flame 31 ejected from the point burner 30 contacts the inner surface of the vial 10, and the like in such a manner that, with respect to the temperature in the circumferential direction in the inner surface of the vial 10, a temperature difference between the temperature of a portion abutting on the flame 31 and the temperature of the other portion is within a desired range. As the portion other than the portion abutting on the flame 31 in the vial 10, a portion facing the roller pair 60 is mentioned, for example. The vial 10 is supported by the outer peripheral surfaces of the roller pair 60 in a state where the opening 16 faces upward with respect to the horizontal direction. Therefore, when the roller pair 60 is counterclockwise rotated, for example, the vial 10 is clockwise rotated. The outer peripheral surface of the vial 10 is rotated while contacting the outer peripheral surfaces of the roller pair 60. The bottom portion 11 of the vial 10 is rotated while abutting on the abutment member 20.

The tip of the ignited point burner 30 is moved to the vicinity of the center of the opening 16 of the vial 10 illustrated in FIG. 4 from the standby position illustrated in FIG. 3 by the rotating device 41. The heating power of the flame 31 ejected from the tip of the point burner 30 is controllable by the flow control device. The heating power of the flame 31 ejected from the tip of the point burner 30 is adjusted to be weaker than the heating power of the flame 31 when the flame 31 is applied to the inner surface 15 of the vial 10 described later. The tip of the point burner 30 is inserted into the internal space 14 of the rotated vial 10 through the opening 16 by the sliding device 42 in the state where the flame 31 is ejected. The nozzle 32 of the point burner 30 is inserted into the internal space 14 of the vial 10 with the axis line of the nozzle 32 along a direction parallel to the axis line of the vial 10. The tip of the point burner 30 is held in the state of being located in the internal space 14 of the vial 10.

As illustrated in FIG. 7, the point burner 30 is tilted by the rotating device 41 so that the tip side of the nozzle 32 faces upward from the state where the axis line of the nozzle 32 is set along a direction parallel to the axis line of the vial 10. In FIG. 7, the vial 10 is illustrated in a cross sectional view and the roller pair 60 is illustrated by the dashed line. The flame 31 ejected from the tip of the point burner 30 is applied to the inner surface 15 of the vial 10. The tilt degree of the point burner 30 is adjusted so that the flame 31 is easily applied to a region deteriorated by processing in the inner surface 15 of the vial 10 according to the shape of the vial 10, the length of the nozzle 32, and the like. In this state, the heating power of the flame 31 ejected from the tip of the point burner 30 is adjusted to have strength sufficient for performing fire blasting. More specifically, the heating power of the flame 31 is required to have strength which allows the removal of alkaline components and the like contained in the region deteriorated by processing to the outside of the vial 10. By the application of the flame 31 ejected from the tip of the point burner 30 to the inner surface 15 of the vial 10, the region deteriorated by processing in the inner surface 15 of the vial 10 is removed. The processing in which the region deteriorated by processing is removed by applying the flame 31 ejected from the tip of the point burner 30 is referred to as fire blasting.

By the rotation of the roller pair 60, the vial 10 is rotated. Therefore, the flame 31 is uniformly applied in the circumferential direction in the inner surface 15 of the vial 10. The point burner 30 is moved in the axial direction (forward and backward direction 103) of the vial 10 by the sliding device 42. With the movement of the point burner 30, the tip of the point burner 30 is scanned along the axial direction (forward and backward direction 103) of the vial 10. For example, the tip of the point burner 30 is moved from the vicinity of the bottom portion 11 to the vicinity of the neck portion 18 in the inner surface 15 of the vial 10. With the movement of the tip of the point burner 30, the flame 31 ejected from the tip of the point burner 30 is scanned along the axial direction (forward and backward direction 103) of the vial 10.

After the fire blasting, the heating power of the flame 31 ejected from the tip of the point burner 30 is adjusted to be weaker than the heating power of the flame 31 ejected from the tip of the point burner 30 in the fire blasting. The point burner 30 is moved by the point burner moving device 40 to achieve a state where the axis line of the nozzle 32 is set along a direction parallel to the axis line of the vial 10. Subsequently, the point burner 30 is moved by the sliding device 42 in a direction where the point burner 30 is separated from the vial 10. Herein, the nozzle 32 of the point burner 30 is moved with the axis line of the nozzle 32 along the direction parallel to the axis line of the vial 10. The nozzle 32 of the point burner 30 is moved to the outside from the internal space 14 through the opening 16 of the vial 10. The point burner 30 is kept away from the vial 10 by the rotating device 41.

As illustrated in FIG. 1, after the vial 10 is subjected to the fire blasting, the roller pair 60 on which the vial 10 is placed is moved by the roller pair moving device 95 to a position (hereinafter also referred to as a vial removal position P3) on the left side in the left and right direction 102 in the fire blasting device 80. At the vial removal position P3, the vial 10 is removed from the top of the outer peripheral surfaces of the roller pair 60 by the vial moving device 94. In detail, the arm 91 is extended downward and the arm 91 is contracted upward after the vial 10 is stuck to the carrying portion 92, whereby the vial 10 is removed from the top of the outer peripheral surfaces of the roller pair 60. The arm support portion 93 is moved in the forward and backward direction 103 while the vial 10 is being stuck to the carrying portion 92. By the removal of the vial 10 from the carrying portion 92, the vial 10 from which the region deteriorated by processing has been removed is obtained.

Subsequent to the fire blasting of the vial 10, another vial 10 different from the vial 10 above can be continuously treated by the vial replacing device 90. The roller pair 60 from which the vial 10 after subjected to the fire blasting has been removed at the vial removal position P3 moves to the vial placement position P1 again by the roller pair moving device 95. Then, at the vial placement position P1, a new vial 10 before fire blasting is placed on the outer peripheral surfaces of the roller pair 60. The new vial 10 is moved to the fire blast position P2 to be subjected to the fire blasting, and then moved to the vial removal position P3 to be removed from the roller pair 60 in the same manner as described above. By repeating such operation, the vial 10 is placed on the same roller pair 60 while replacing, and then the fire blasting is repeated.

[Operational Effects of this Embodiment]

According to this embodiment, the vial 10 is heated by the application of the flame 31 to the inner surface 15 of the vial 10. By the application of the flame 31 to a region deteriorated by processing, the region deteriorated by processing is removed. The outer peripheral surface of the vial 10 contacts the outer peripheral surfaces of the roller pair 60. The side surface portion 12 of the vial 10 is supported by the outer peripheral surfaces of the first roller 61 and the second roller 62. While the flame 31 is being applied to the inner surface 15 of the vial 10, the first roller 61 and the second roller 62 contact, while rotating, the outer peripheral surface of the rotating vial 10 on each outer peripheral surface. Therefore, the deformation in the vertical direction 101 of the vial 10 is prevented. Accordingly, the vial 10 prevented from breakage and deformation is manufactured.

Moreover, in the processing process described above, the flame 31 ejected from the point burner 30 is scanned in the axial direction of the vial 10 while rotating the vial 10. Thus, the range where the flame 31 ejected from the point burner 30 is directly applied to the vial 10 is widened in the axial direction. Therefore, the region deteriorated by processing is eliminated over a wider range in the axial direction.

Moreover, the entire outer peripheral surface having the largest diameter in the vial 10 is made to abut on the outer peripheral surface of each of the first roller 61 and the second roller 62. Thus, the entire outer peripheral surface in the side surface portion 12 of the vial 10 abuts on the outer peripheral surface of each of the first roller 61 and the second roller 62. The heat of the vial 10 is transmitted from the entire outer peripheral surface in the side surface portion 12 of the vial 10 to the first roller 61 and the second roller 62. Therefore, the heat of the entire outer peripheral surface in the side surface portion 12 of the vial 10 is uniformly dissipated, whereby the deformation of the side surface portion 12 of the vial 10 is further prevented.

Moreover, with respect to the first roller 61 and the second roller 62, each axis line of the first roller 61 and the second roller 62 tilts with respect to the horizontal direction so that the surface facing the point burner 30 is located above the opposite surface. Thus, the vial 10 supported by the outer peripheral surface of each of the first roller 61 and the second roller 62 is placed on the first roller 61 and the second roller 62 in such a manner that the outer peripheral surface of the vial 10 contacts the outer peripheral surfaces of the both the first roller 61 and the second roller 62, and therefore the vial 10 is supported so that the opening of the vial 10 faces upward with respect to the horizontal direction. Therefore, the vial 10 is maintained at a stable position without moving in the horizontal direction.

Moreover, in order to remove a region deteriorated by processing, the flame 31 is sprayed to the inner surface 15 of the vial 10. Thus, the power for moving the vial 10 to the bottom portion 13 side in the axial direction is applied to the vial 10. The bottom portion 13 of the vial 10 abuts on the abutment member 20. Therefore, the abutment member 20 regulates the movement of the vial 10 to the bottom portion 13 side in the axial direction.

Moreover, the heat given to the vial 10 is transmitted to the roller pair 60 at the point of contact (region along each axial direction in each outer peripheral surface) between the vial 10 and the roller pair 60. Similarly, the bottom portion 13 of the vial 10 contacts the abutment member 20. The heat given to the vial 10 is transmitted to the abutment member 20 at the point of contact (region) between the vial 10 and the abutment member 20. Since at least members forming each outer peripheral surface of the roller pair 60 or the abutment member 20 contain those having heat dissipation performance higher than that of stainless steel (for example, graphite is mentioned.), the roller pair 60 and the abutment member 20 have heat dissipation performance higher than that of stainless steel. Therefore, the heat transmitted to the roller pair 60 and the abutment member 20 is more easily and more rapidly dissipated than stainless steel. Moreover, even when the roller pair 60 and the abutment member 20 are used for the fire blasting continuously twice or more, the fact is prevented that the heat is accumulated in the roller pair 60 and the abutment member 20, and thus the temperature becomes excessively high as compared with that of stainless steel. Therefore, a plurality of vials 10 having good quality prevented from breakage and deformation are continuously manufactured.

Moreover, the length in the axial direction of the first roller 61 and the second roller 62 is longer than the length in the axial direction of the entire outer peripheral surface having the largest diameter in the vial 10. Thus, the entire outer peripheral surface having the largest diameter in the vial 10 abuts on the outer peripheral surface of each of the first roller 61 and the second roller 62. Since the heat of the entire outer peripheral surface of the vial 10 is uniformly dissipated, the deformation of the side surface portion 12 of the vial 10 is further prevented.

Moreover, the number of rotations of the roller pair 60 is adjustable, and therefore a temperature difference between the temperature of a portion where the vial 10 abuts on the flame 31 ejected from the point burner 30 and the other portion is within a desired range in the inner surface of the vial 10 in the fire blast process.

[Modification]

In this embodiment, although the vial 10 is molded using a common vertical molding device in the container molding process, other molding methods may be employed. For example, the vial 10 may be molded by molding a glass container from a glass tube held with the axis line of the glass tube along the horizontal direction (i.e., using a so-called horizontal molding device).

Moreover, the glass container is not limited to the vial 10 and may be a glass container of another shape. For example, the glass container may be an ampule-shaped glass container or may be an intermediate article in which the vial 10 is not completely molded e.g., an intermediate article in which the bottom portion 11 is molded but the mouth portion 13 is not molded, for example.

Moreover, the roller pair 60 is not limited to one pair and a plurality of roller pairs 60 may be used. For example, a plurality of vials 10 may be simultaneously subjected to the fire blasting by simultaneously using the plurality of roller pairs 60. In that case, the plurality of roller pairs 60 are provided in the roller pair moving device 95 in a state where the axis lines of all the rollers are parallel to each other. Two or more of the point burners 30 are provided corresponding to each roller pair 60 or adjacent roller pairs 60.

Moreover, the shape of the roller pair 60 is not limited to a cylindrical shape and may be a shape along the outer peripheral surface of the vial 10. For example, by shaping the roller pair 60 so as to follow not only the side surface portion 12 but the outer peripheral surface of each portion, such as the neck portion 18 and the mouth portion 13, of the vial 10, all the portions in the outer peripheral surface of the vial 10 abut on the outer peripheral surface of each of the first roller 61 and the second roller 62. Therefore, breakage and deformation of the side surface portion of the vial 10 are further prevented.

Moreover, in order to rotate the roller pair 60, the chain 98 is used. However, pinion gears engaged with the roller shaft pinion gears 69 may be provided, and the roller pair 60 may be rotated by rotating these pinion gears.

Moreover, with respect to the roller pair 60, the axis line of the roller pair 60 tilts with respect to the horizontal direction (forward and backward direction 103) so that the surface facing the point burner 30 is located above the opposite surface. However, the roller pair 60 may be located so that the axis line of the roller pair 60 is directed in the horizontal direction (forward and backward direction 103). In connection therewith, the point burner 30 may be moved in the horizontal direction (forward and backward direction 103) in a state where the axis line of the point burner 30 is fixed to be directed in the horizontal direction (forward and backward direction 103), whereby the nozzle 32 of the point burner 30 may be inserted into the internal space 14 of the vial 10.

Moreover, the point burner 30 is rotated by the point burner moving device 40 so that the axial direction of the nozzle 32 of the point burner 30 tilts with respect to the horizontal direction in order to apply the flame 31 ejected from the tip of the point burner 30 to the region deteriorated by processing in the inner surface 15 of the vial 10. However, the flame 31 ejected from the tip of the point burner 30 may be applied to the region deteriorated by processing in the inner surface 15 of the vial 10 by further tilting the axial direction of the vial 10 with respect to the horizontal direction in a state where the point burner 30 is fixed.

Moreover, the inner surface 15 of the vial 10 to which the flame 31 ejected from the tip of the point burner 30 is applied is not necessarily required to be the entire inner surface 15 in the third process. For example, when the region deteriorated by processing is present only near the bottom portion 11 of the inner surface 15 of the vial 10, the flame 31 may be applied only to the vicinity of the bottom portion 11 of the inner surface 15.

Moreover, in the vial replacing device 90, the vial 10 is moved by causing the vial 10 to stick to the carrying portion 92 by pressure reduction. However, the vial 10 may be replaced by using an arm or the like holding the vial 10.

Moreover, the shape of the abutment member 20 is not limited to the flat plate and any flat plate having a shape abutting on the bottom portion 11 of the vial 10 may be acceptable. For example, arbitrary shapes, such as a circular shape, a triangular shape, or a trapezoid shape, may be acceptable.

Moreover, the abutment member 20 is not limited to one in which the entire abutment member 20 contains one having heat dissipation performance higher than that of stainless steel and may be one in which only a portion abutting on the bottom portion 11 of the vial 10 of the abutment member 20 has heat dissipation performance higher than that of stainless steel.

EXAMPLES

Hereinafter, Examples of the present invention are described.

[Process of Molding Vial 10]

Vials 10 were molded by the container molding process described in the embodiment described above. The vials 10 were molded by processing a glass tube using a standard vertical molding device. The vials formed in Examples 1 to 7 have a size of an outer diameter of 18 mm, an overall length of 33 mm, and a capacity of 3 mL. The vials 10 formed in Examples 8 and 9 have a size of an outer diameter of 24.5 mm, an overall length of 46.5 mm, and a capacity of 10 mL.

Examples 1 to 7

12 molded vials 10 were subjected to the fire blast process described in the embodiment described above. The vials 10 were rotated by the roller pair 60. As a member forming the outer peripheral surfaces of the roller pair 60, one containing graphite (manufactured by Toyo Tanso, Inc., Black lead graphite 100%) was used. The number of rotations of the roller pair 60 is 880 rpm. The flow rates of gas and oxygen introduced into the point burner 30 were adjusted with a mass flow meter. The fire blasting was carried out based on the conditions shown in the following table 1. The conditions of Example 1 are the flow rates of gas and oxygen and the processing time shown in the row of the condition number 1 of Table 1. Also with respect to Examples 2 to 7, the fire blasting was carried out under the conditions shown in the rows of the condition numbers 2 to 7 of Table 1 in the same manner as in Example 1.

TABLE 1

Fire blast conditions and results

| | Fire blast conditions | | | Broken vial (pieces/pieces) | |
|---|---|---|---|---|---|
| Condition No. | Gas flow rate (L/min) | Oxygen flow rate (L/min) | Processing time (sec) | Ex. | Comp. Ex. |
| 1 | 0.40 | 0.90 | 14 | 0/12 | 0/17 |
| 2 | 0.40 | 0.90 | 22 | 0/12 | 1/17 |
| 3 | 0.40 | 0.90 | 32 | 0/12 | 1/17 |
| 4 | 0.50 | 1.12 | 8 | 0/12 | 0/17 |
| 5 | 0.50 | 1.12 | 14 | 0/12 | 0/17 |
| 6 | 0.60 | 1.34 | 8 | 0/12 | 1/17 |
| 7 | 0.60 | 1.34 | 14 | 0/12 | 3/17 |

Examples 8 and 9

20 molded vials 10 were subjected to the fire blast process described in the embodiment described above. As the conditions under which the fire blast process was carried out, the number of rotations of the roller pair 60 of Example 8 is 880 rpm and the number of rotations of the roller pair 60 of Example 9 is 1000 rpm. The other conditions under which the fire blast process was carried out are the same as those of Examples 1 to 7, except the processing time is 10 sec and the fire blast process was carried out under the conditions shown in the following table 2.

TABLE 2

Fire blast conditions and results

| | Fire blast conditions | | | Broken vial (pieces/pieces) | |
|---|---|---|---|---|---|
| Condition No. | Gas flow rate (L/min) | Oxygen flow rate (L/min) | Number of rotations (rpm) | Ex. | Comp. Ex. |
| 8 | 0.86 | 1.94 | 880 | 0/20 | 10/20 |
| 9 | 0.86 | 1.94 | 1000 | 0/20 | 9/20 |

Comparative Examples 1 to 7

17 molded vials 10 were subjected to the fire blast process described in the embodiment described above. The conditions under which the fire blast process was carried out are the same as those of Examples 1 to 7, except the material of the roller pair 60 is stainless steel.

Comparative Examples 8 and 9

20 molded vials 10 were subjected to the fire blast process described in the embodiment described above. The conditions under which the fire blast process was carried out are the same as those of Examples 8 and 9, except the material of the roller pair 60 is stainless steel.

[Temperature Measurement of Vial 10 and Roller Pair 60]

In Example 8 and Comparative Example 8, the temperatures of the vials 10 and the roller pairs 60 in the fire blast process were measured. Each of the vials 10 and the roller pairs 60 when 10 vials 10 were continuously subjected to the fire blasting was measured for the temperature. The measurement was performed using a thermograph (FSV-1200 series infrared thermography, manufactured by Apiste Corporation). For the vials 10, the temperatures of 4 positions of 0 mm (position V-0) from the vial bottom, 5 mm (position V-5) from the vial bottom, 20 mm (position V-20) from the vial bottom, and 35 mm (position V-35) from the vial bottom were measured. For the roller pairs 60, the temperature of 3 positions of 5 mm (position R-5) from the roller bottom, 20 mm (position R-20) from the roller bottom, and 35 mm (position R-35) from the roller bottom were measured.

[Results and Evaluation]

Hereinafter, the results of Examples 1 to 9 and Comparative Examples 1 to 9 and the temperature measurement results of the vials 10 and the roller pairs 60 are described. Moreover, in addition to the results, the evaluations thereof are described.

Table 1 above shows the number of the vials 10 obtained in Examples 1 to 7 and Comparative Examples 1 to 7 in which breakage, such as cracks, occurred. In Table 1, (pieces/pieces) shows (Number of the vials 10 in which breakage was confirmed/Number of the vials 10 subjected to fire blasting). The comparison of the vials 10 obtained in Examples 1 to 7 and Comparative Examples 1 to 7 shows that no breakage was confirmed in the 12 vials 10 obtained in Examples 1 to 7. On the other hand, among the 17 vials 10 obtained in Comparative Examples 1 to 7, the breakage was confirmed in one vial in each of the condition numbers 2, 3, and 6 and in three vials 10 in the condition number 7. Therefore, it was confirmed that the occurrence of the breakage is prevented in Examples 1 to 7 as compared with Comparative Examples 1 to 7.

Table 2 shows the number of the vials 10 obtained in Examples 8 and 9 and Comparative Examples 8 and 9 in which breakage, such as cracks, occurred. In Table 2, (pieces/pieces) shows (Number of the vials 10 in which breakage was confirmed/Number of the vials 10 subjected to fire blasting). The comparison of the vials 10 obtained in Examples 8 and 9 and Comparative Examples 8 and 9 shows that no breakage was confirmed in the 20 vials 10 obtained in Examples 8 and 9. On the other hand, among the 20 vials 10 obtained in Comparative Examples 8 and 9, the breakage was confirmed in 10 vials in the condition number 8 and in 9 vials 10 in the condition number 9. Therefore, it was confirmed that the occurrence of the breakage is prevented in Examples 8 and 9 as compared with Comparative Examples 8 and 9.

Table 3 shown below shows the results obtained by measuring the temperatures of the vials 10 and the roller pairs 60. As temperature differences between the highest temperature and the lowest temperature at each of the above-described positions of the vials 10, it was observed that the temperature difference of Example 8 tends to be smaller than that of Comparative Example 8. As temperature differences between the different positions (for example, the position V-5 and the position V-35) of the vials 10, it was observed that the temperature difference of Example 8 is smaller than that of Comparative Example 8. Therefore, it was confirmed that the roller pair 60 of Example 8 containing graphite has good heat conduction from the vial 10 to the roller pair 60 as compared with the roller pair 60 of Comparative Example containing stainless steel. Furthermore, as the temperature differences between the highest temperature and the lowest temperature in the roller pairs 60, it was confirmed that the temperature difference of Example 8 tends to be somewhat larger than that of Comparative Example 8. Therefore, it was confirmed that the roller pair 60 of Example 8 containing graphite has good heat conduction from the vial 10 to the roller pair 60 as compared with the roller pair 60 of Comparative Example containing stainless steel. Moreover, from the temperature difference between the highest temperature and the lowest temperature at each position of the vials 10, the temperature difference of the roller pair 60 is smaller than the temperature difference which is considered to result from the heat absorption from the vial 10 by the roller pair 60. This confirmed that the roller pair 60 of Example 8 containing graphite has a heat dissipation effect higher than that of the roller pair 60 of Comparative Example containing stainless steel.

TABLE 3

Measuring the temperatures of the vials 10 and the roller pairs 60

| | | Ex. 8 Indicated temperature | | | Comp. Ex. 8 Indicated temperature | | |
|---|---|---|---|---|---|---|---|
| | Measurement position | Highest | Lowest | Difference | Highest | Lowest | Difference |
| V-0 | 0 mm from vial bottom | 460 | 350 | 110 | 680 | 400 | 280 |
| V-5 | 5 mm from vial bottom | 620 | 480 | 140 | 720 | 570 | 150 |
| V-20 | 20 mm from vial bottom | 590 | 580 | 10 | 620 | 580 | 40 |
| V-35 | 35 mm from vial bottom | 400 | 380 | 20 | 390 | 380 | 10 |
| R-5 | 5 mm from roller bottom | 130 | 30 | 100 | 100 | 30 | 70 |
| R-20 | 20 mm from roller bottom | 130 | 30 | 100 | 100 | 30 | 70 |
| R-35 | 35 mm from roller bottom | 130 | 30 | 100 | 100 | 30 | 70 |

Figure 9:
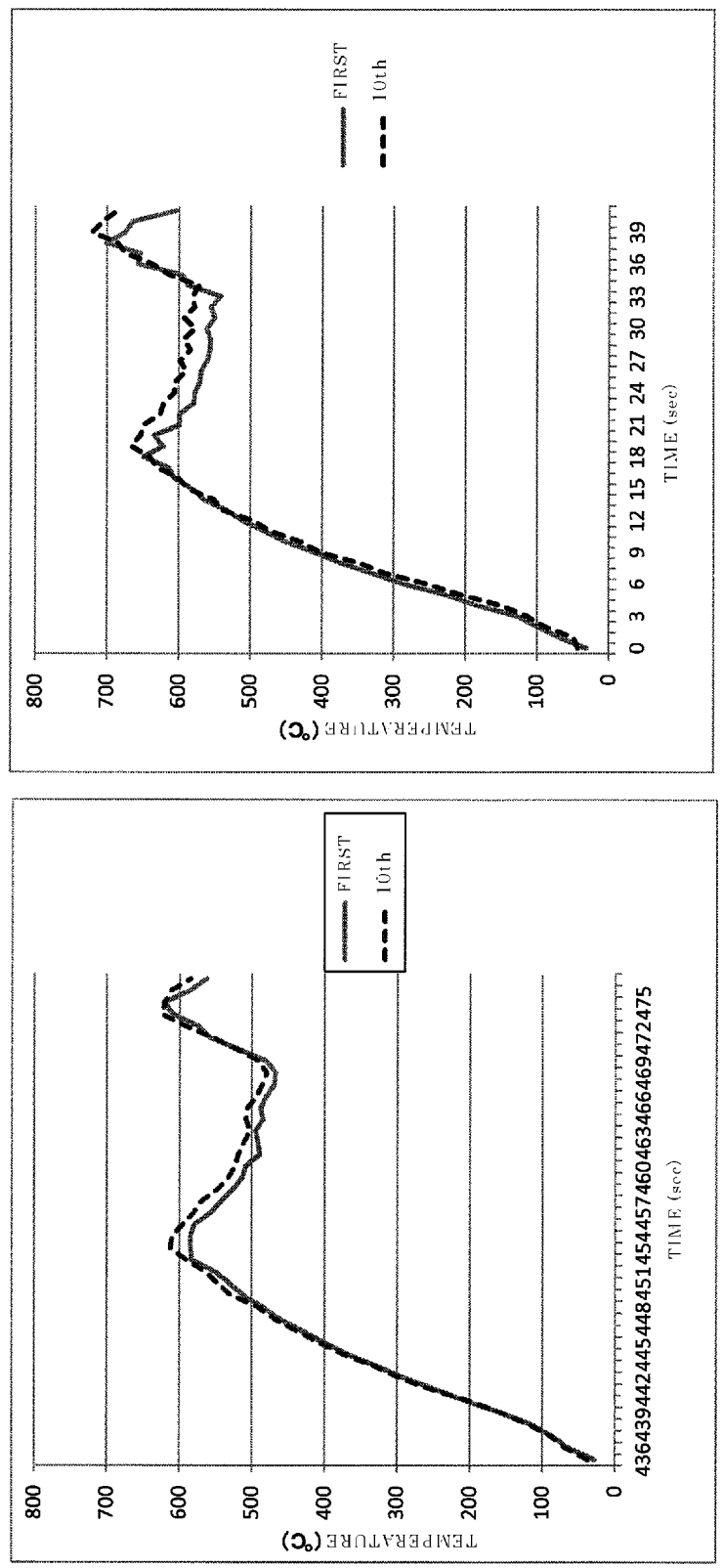
FIG. 9(A) shows temperature changes with time in each of the first fire blasting and the 10th fire blasting at a position of 5 mm (position V-5) from the vial bottom in a vial 10 of Example 8.
FIG. 9(B) shows temperature changes with time in each of the first fire blasting and the 10th fire blasting at a position of 5 mm (position V-5) from the vial bottom in a vial 10 of Comparative Example 8.

FIG. 9(A) and FIG. 9(B) show the temperature changes with time of the vial 10 and the roller pair 60 when continuously subjected to the fire blasting. FIG. 9(A) and FIG. 9(B) each show the temperature changes with time of the first fire blasting and the 10th fire blasting. The comparison between FIG. 9(A) and FIG. 9(B) showed that the difference between the first fire blasting and the 10th fire blasting of Example 8 shown in FIG. 9(A) tends to be smaller than the difference between the first fire blasting and the 10th fire blasting of Comparative Example 8 shown in FIG. 9(B). This confirmed that the roller pair 60 of Example 8 containing graphite has a small temperature change and the temperature of the roller pair 60 is stable even when continuously used as compared with the roller pair 60 of Comparative Example containing stainless steel.

REFERENCE SIGNS LIST

10 Vial (Glass container)
11 Bottom portion
12 Side surface portion
13 Mouth portion
15 Inner surface
20 Abutment member
30 Point burner
31 Flame
32 Nozzle
60 Roller pair
61 First roller
62 Second roller
72 Rotation control unit
80 Fire blasting device
90 Vial replacing device (Replacing device)

The invention claimed is:

1. A method for manufacturing a plurality of medical glass containers, in which for each one medical glass container of the plurality of medical glass containers a glass tube is molded to form said one medical glass container so as to have at least a closed bottom portion, a mouth portion opposite the closed bottom portion, and a sidewall portion between said mouth portion and said closed bottom portion, the sidewall portion having an outer peripheral surface and an inner surface, said method comprising processing each one medical glass container of the plurality of medical glass containers to reduce elution of alkaline components from a deteriorated glass region at an inner surface of the sidewall portion, including the steps:

placing a first medical glass container of said plurality of medical glass containers, using a medical container placing device, so as to have a first portion of said sidewall portion in contact with and supported by an outer peripheral surface of a first roller and a second portion of said sidewall portion in contact with and supported by a second roller, wherein each one roller of the first roller and the second roller has a rotational axis in parallel with each other, and have an axial length at least as long as an axial length of said sidewall portion, wherein the first roller and second roller are disposed so that an axis line of the said first medical glass container is parallel to the rotational axes of the first roller and the second roller, wherein the first roller and the second roller are disposed side by side with a closest distance between the first roller and the second roller being narrower than an outer diameter of said sidewall portion, so that in a direction transverse to the axis line of said first medical glass container at each axial position along said first portion and second portion, said first portion and second portion are spaced apart by a distance less than said outer diameter of the sidewall portion at said axial position, rotating the first roller about the rotational axis of the first roller to apply a rotational force to said first medical glass container causing rotation of said first medical glass container, applying said flame ejected from said point burner to the deteriorated glass region at the inner surface of said first medical glass container, wherein the flame has a heating power which reduces elution of alkaline components from the deteriorated glass region, while rotating said first medical glass container, the flame impinging on said inner surface of the sidewall portion, wherein said outer peripheral surface of the sidewall portion, corresponding to the inner surface where the flame impinges, moves into contact with one of the first roller and second roller as the first medical glass container is rotated, and during said rotating and applying, dissipating heat uniformly over said axial length of the sidewall portion by contacting a first portion of said outer peripheral surface of the sidewall portion with the first roller for said axial length of said sidewall portion and by contacting a second portion of said outer peripheral surface area of the sidewall portion with the second roller for said axial length of said sidewall portion to prevent breakage of said first medical glass container and to prevent deformation along said axial length of the sidewall portion of said first medical glass container, rotation of the first roller rotating said first molded medical glass container so that the first portion of the outer peripheral surface area changes during said dissipation to be a surface area of the sidewall portion which has had the corresponding inner surface directly heated by said flame, removing said one medical glass container from the first roller and second roller using a medical glass container removing device, repeating the steps of placing, setting, rotating, applying, dissipating, and removing for a second medical glass container of said plurality of medical glass containers using a third roller in place of the first roller and a fourth roller in place of the second roller, wherein said outer peripheral surface of the sidewall portion of the second medical glass container, corresponding to the inner surface where the flame impinges, moves into contact with one of the third roller and fourth roller as the second medical glass container is rotated, after said first medical glass container is removed, repeating the steps of placing, setting, rotating, applying, dissipating, and removing for a third medical glass container of said plurality of medical glass containers using the first roller and second roller, wherein the first roller, second roller, third roller and fourth roller are moved by a roller pair moving device, where the axis line of each of the first roller, second roller, third roller and fourth roller are parallel to each other.

2. The method for manufacturing the plurality of medical glass containers according to claim 1, wherein said applying said flame comprises:
scanning the flame ejected from the point burner in the axial direction of said first molded medical glass container while rotating said first molded medical glass container.

3. The method for manufacturing the plurality of medical glass containers according to claim 1, wherein said placing further comprises:
abutting an outer peripheral surface of the sidewall portion having a largest diameter in said first molded medical glass container with the outer peripheral surface of each of the first roller and the second roller.

4. The method for manufacturing the plurality of medical glass containers according to claim 1 wherein
with respect to the first roller and the second roller, the rotational axis of each of the first roller and the second roller tilts with respect to a horizontal direction so that a surface facing the point burner is located above an opposite surface.

5. The method for manufacturing the plurality of medical glass containers according to claim 1 wherein said placing further comprises:
abutting the closed bottom portion of said first molded medical glass container with an abutment member to position the glass container with respect to a direction along the rotational axes of the first roller and the second roller.

6. The method for manufacturing the plurality of medical glass containers according to claim 1 wherein
members forming at least the outer peripheral surface of each of the first roller and the second roller have heat dissipation performance higher than heat dissipation performance of stainless steel.

7. The method for manufacturing the plurality of medical glass containers according to claim 6, wherein
the members forming at least the outer peripheral surface of each of the first roller and the second roller contain graphite.

8. The method for manufacturing the plurality of medical glass containers according to claim 5, wherein
the abutment member has heat dissipation performance higher than heat dissipation performance of stainless steel.

9. The method for manufacturing the plurality of medical glass containers according to claim 8, wherein
the abutment member contains graphite.

10. The method for manufacturing the plurality of medical glass containers according to claim 1, wherein said processing comprises:
setting a first number of rotations of the first roller for processing the first medical glass container, and
setting a second number of rotations of the first roller for processing the third medical glass container, the second number differing from the first number.

* * * * *